United States Patent
Stefanov et al.

(10) Patent No.: US 9,015,722 B2
(45) Date of Patent: Apr. 21, 2015

(54) EFFICIENT CACHE REUSE THROUGH APPLICATION DETERMINED SCHEDULING

(75) Inventors: Ekaterina Stefanov, Normanhurst (AU); David Robert James Monaghan, Eastwood (AU); Paul William Morrison, St Clair (AU)

(73) Assignee: Canon Kabushiki Kaisha, Tokyo (JP)

( * ) Notice: Subject to any disclaimer, the term of this patent is extended or adjusted under 35 U.S.C. 154(b) by 224 days.

(21) Appl. No.: 13/588,528

(22) Filed: Aug. 17, 2012

(65) Prior Publication Data
US 2013/0047162 A1    Feb. 21, 2013

(30) Foreign Application Priority Data
Aug. 19, 2011    (AU) .................................. 2011213795

(51) Int. Cl.
*G06F 9/50*    (2006.01)
*G06F 13/00*    (2006.01)

(52) U.S. Cl.
CPC ...... *G06F 9/5033* (2013.01); *G06F 2209/5018* (2013.01)

(58) Field of Classification Search
None
See application file for complete search history.

(56) References Cited

U.S. PATENT DOCUMENTS

| 5,287,508 A | 2/1994 | Hejna, Jr. et al. |
| 6,069,705 A | 5/2000 | Suvarna |
| 6,269,390 B1 | 7/2001 | Boland |

FOREIGN PATENT DOCUMENTS

EP    557050 A1    8/1993

*Primary Examiner* — Qing Wu
(74) *Attorney, Agent, or Firm* — Canon USA, Inc., IP Division

(57) ABSTRACT

A method of determining a thread from a plurality of threads to execute a task in a multi-processor computer system. The plurality of threads is grouped into at least one subset associated with a cache memory of the computer system. The task has a type determined by a set of instructions. The method obtains an execution history of the subset of plurality of threads and determines a weighting for each of the set of instructions and the set of data, the weightings depending on the type of the task. A suitability of the subset of the threads to execute the task based on the execution history and the determined weightings, is then determined. Subject to the determined suitability of the subset of threads, the method determining a thread from the subset of threads to execute the task using content of the cache memory associated with the subset of threads.

20 Claims, 14 Drawing Sheets

EFFICIENT CACHE REUSE THROUGH APPLICATION DETERMINED SCHEDULING

REFERENCE TO RELATED PATENT APPLICATION

This application claims the benefit under 35 U.S.C. §119 of the filing date of Australian Patent Application No. 2011213795, filed Aug. 19, 2011, hereby incorporated by reference in its entirety as if fully set forth herein.

TECHNICAL FIELD

The present invention relates to computer-based systems and, in particular, to increasing cache hit rates through process scheduling within an application program.

BACKGROUND

Cache memory in computer systems is used to store a copy of data items, be it either instructions or operands from main memory locations, for convenient and fast access by a central processing unit (CPU). Cache reuse is highly desirable as it reduces memory access time and thus, leads to significant execution speedup for most software applications. Efficient cache reuse within a process (or a thread in a multithreaded application) depends on the quality of the application program code, while inter-process and inter-thread efficient cache reuse involves keeping track of what has already been loaded in the cache and selecting subsequent processes/threads for execution next in view of cache content reuse.

Keeping track of cache content is achieved in the art typically by either employing hardware means or software techniques. Often, there is a trade-off between the accuracy of the cache content information gathered and the amount of time and resources dedicated to that process. Some cache reuse methods are generalised and thus applicable to any program or process, while others are more specialised.

Furthermore, some methods target data cache content reuse, while others target instruction cache content reuse. In some cases, the method is applicable to both data and instruction, without targeting either in particular.

One approach to data cache reuse known in the prior art is as follows. Processes that do not share any data are scheduled on different processors if possible in a multi-processor system. In addition the processes that cannot be executed at the same time due to dependencies, but do share common data among each other are scheduled on CPUs in a way that allows them to share cache content. The method requires detailed knowledge of the algorithms operative in the particular application and only data reuse is considered.

Other prior art aims at increasing the instruction data locality by scheduling the same process on the same processor. Only instruction reuse is considered.

A main shortcoming of some prior art methods is that they are designed to either facilitate data reuse or instruction reuse, but do not consider both.

Other, more general prior art approaches facilitate both instruction and data reuse through either hardware means or software techniques by measuring the cache warmth of the cache content with regards to a given process. Cache warmth is a term sometimes used to describe the age of data of a specific process found in cache and is measured in various ways in prior art, including methods such as counting the number of requests of each processor for each process, or keeping track of the cache misses for subsections of the cache, or even tracking the cache use on a line-by-line basis.

A cache miss occurs when the CPU cannot find a data item in the cache. This necessitates fetching the data item from either lower level caches or main memory with an associated performance penalty.

The main disadvantages of these more general prior art approaches to cache content reuse lie in their complexity and the overhead that complexity imposes on program execution. They also often require specialised hardware for their implementation.

SUMMARY

It is an object of the present disclosure to substantially overcome or at least ameliorate one or more disadvantages of prior art arrangements.

According to the present disclosure, a scheduler having internal knowledge of the application is deployed to minimise cache miss rates by reducing the cache misses resulting from context switching in a computer system without imposing heavy processing overhead.

Disclosed are arrangements, in which a preference is given to one of many groups of threads to execute a task, based on both the collective execution or processing history of the threads within these groups and the characteristics of the task to be executed.

In accordance with one aspect of the present disclosure there is provided a method of determining a thread from a plurality of threads to execute a task in a multi-processor computer system, the plurality of threads being grouped into at least one subset associated with a cache memory of the computer system, the task having a type determined by a set of instructions, the method comprising the steps of:

obtaining an execution history of the subset of plurality of threads;

determining a weighting for each of the set of instructions and the set of data, the weightings depending on the type of the task;

determining a suitability of the subset of the threads to execute the task based on the execution history and the determined weightings; and subject to the determined suitability of the subset of threads, determining a thread from the subset of threads to execute the task using content of the cache memory associated with the subset of threads.

Desirably the weightings determine one of a task history and a data history to be used to determine the suitability of the subset of threads to be used. Preferably the determining of the suitability of the subset of the threads comprises the sub-steps of: checking the task history to determine the suitability of the subset of the threads to execute the task before the data history in an event that the weighting for the instruction is larger than the weighting for the data; and checking the data history to determine the suitability of the subset of the threads to execute the task before the task history in an event that the weighting for the data is larger than the weighting for the instruction.

Advantageously the weightings are determined based on the execution history of the subset of the plurality of threads. Alternatively the weightings may be determined using a lookup table.

Generally the execution history has a size dependent on a size of the cache memory. Alternatively the execution history has a size dependent on a size of most commonly executed instructions associated with a set of tasks executed by the threads. In a further alternative the execution history has a size dependent on data used by a set of tasks executed by the threads.

According to another aspect of the present disclosure there is provided a method of managing cache reuse of a cache memory to process a print task in a multi-processor computer system, the cache memory being associated with a subset of a plurality of threads, the task having a type determined by a set of instructions for the print task, the method comprising the steps of:

obtaining an execution history of the subset of plurality of threads;

determining a weighting for each of the set of instructions and the set of data, the weightings depending on the type of the task;

determining a suitability of the subset of the threads to execute the print task based on the execution history and the determined weightings; and reusing the cache memory in an event that the subset of the threads is determined to be suitable by determining a thread from the subset of to process the print task.

According to a yet further aspect of the present disclosure there is provided a method of determining a task from a plurality of tasks for execution by a thread in a multi-processor computer system, the thread being one of a plurality of threads grouped into at least one subset associated with a cache memory of the computer system, the task having a type determined by a set of instructions, the method comprising the steps of:

obtaining an execution history of the thread and identify a corresponding cache memory;

identifying an available task for execution and determining a weighting for each of the set of instructions and the set of data, the weightings depending on the type of the identified task;

determining a suitability of the identified task to execute upon the thread based on the execution history and the determined weightings; and subject to the determined suitability of the subset of threads, determining the identified task from the plurality of tasks to be executed upon the thread based on content of the corresponding cache memory.

Desirably the weightings determine one of an task history and a data history to be used to determine a task to be used. Preferably the determining of the suitability of a task from a plurality of tasks for execution by a thread comprises the sub-steps of: checking the task history to determine the suitability of the task to be executed by the thread in an event that the weighting for the instruction is larger than the weighting for the data for the task; and checking the data history to determine the suitability of the task to be executed by the thread in an event that the weighting for the data is larger than the weighting for the instruction for the task.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

Figure 1:
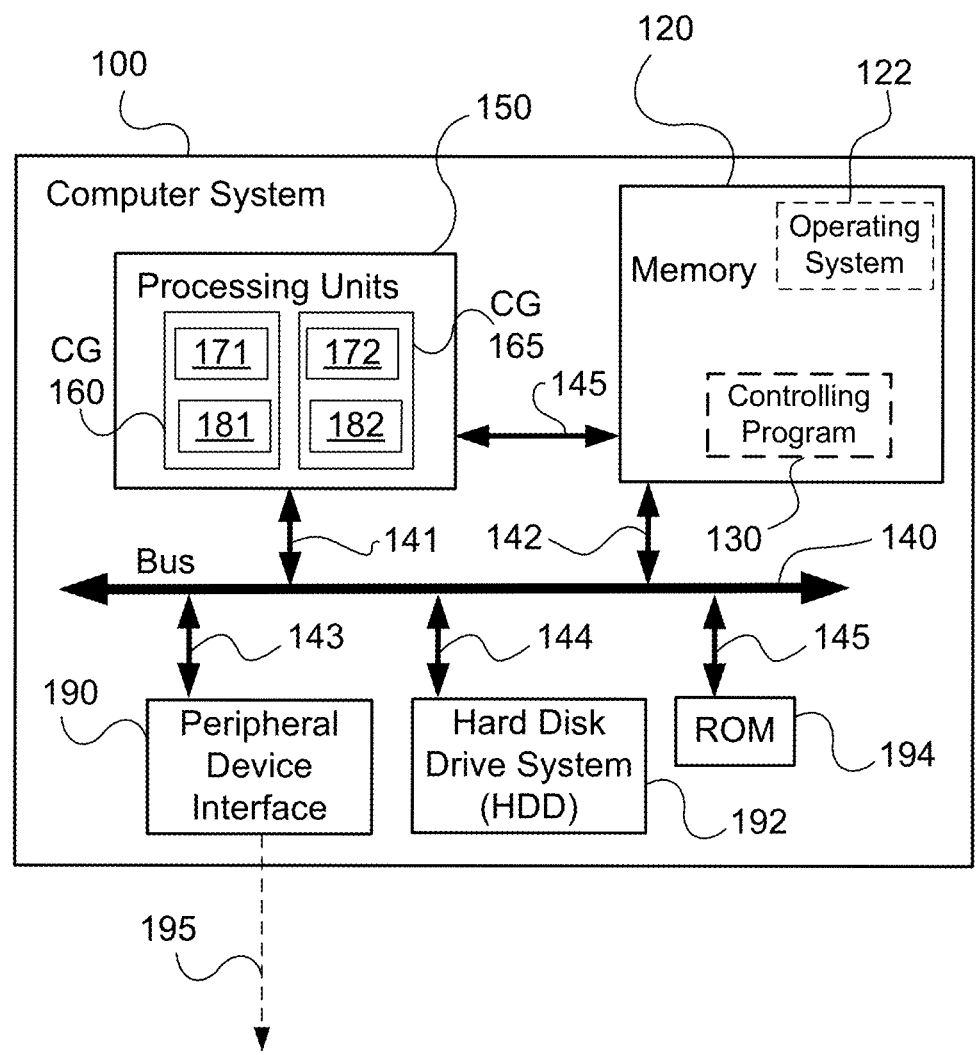
FIG. 1 is a schematic block diagram illustrating part of an exemplary computer system in which the arrangements to be described may be implemented.

The trend of achieving improved performance speed through the use of multi-processor architectures in computer systems has gained widespread use in recent years. Multi-processor architectures allow a number of threads belonging to one or more processes to execute in parallel across a number of central processing units (CPUs), thereby reducing the overall execution time.

Along with number of CPUs and CPU speed, memory configuration of a computer system greatly influences processing speed. Hierarchical memory structure is a commonly accepted architecture for modern memory systems which places smaller and faster memories, called caches, closer to the CPU. Caches placed at the same depth in the memory hierarchy are said to be of the same cache level. A cache memory is used to store a subset of the main memory content closer to the CPU for convenient and faster access.

Level 1 (L1) caches are the closest to the CPU and are placed or otherwise configured on the same hardware chip. L1 caches are small and extremely fast. Level 2 (L2) caches are bigger than L1 caches. L2 is usually the last cache on the CPU chip. Level 3 (L3) caches, when present, are bigger and thus slower than the upper level caches, but still much faster than the main memory. L3 cache is, generally located on a computer motherboard immediately adjacent the CPU, often with direct and dedicated interconnections with the CPU. L3 cache generally produces fewer cache misses than the L1 and L2 caches, this arising simply from the greater size of L3 caches.

At each level, caches may be formed of either physically separate data and instruction caches, or unified caches for both data and instructions. In both cases, data and instructions can be considered independent. The arrangements presently disclosed can be used for both cases.

When an item (either instruction or operand (data)) is requested by a CPU for the first time, the content of the main memory block to which the item belongs is loaded into the cache in a cache line. Subsequent requests for the same item or an item from the same block are satisfied by accessing that cache line. If the requested item is found in the cache an event known in the art as a cache hit, access to the requested item is much faster than when the requested item has to be fetched from the main memory which happens on a cache miss. While anything loaded into the cache is data of one kind of another, a distinction is often made between program code (instructions) and the operands (data) on which the program code operates. In this description, the former is referred to as 'instructions' and the latter, simply as 'data'. The process of determining if a cache contains instructions or data, and loading a cache line in the event of a cache miss, is performed by the processor being used to execute the application. The arrangements presently disclosed are applicable to all common methods of managing cache instructions and data.

In order to take advantage of the parallelism in a multi-processor system, the processing is typically broken down into largely independent units of work, for the purposes of this description known as tasks, that can be executed in parallel. A program execution requires the completion of one or more tasks. When executed in parallel, each task is executed upon a thread.

In preferred implementations of the arrangements presently disclosed, a one-to-one correspondence is maintained between tasks and threads, i.e. a task is executed on only one thread at a time. Examples of tasks can include a rendering process in a graphical image creation program, and a mathematical operation ascribed to a column of numerical data in a spreadsheet application. Tasks can therefore vary in size and complexity, this according to the manner in which the application program is coded or desired to be executed.

From scheduling point of view tasks are the smallest schedulable unit of work and are always run to completion. A task is defined by its type (TASK_ID) and the data the task is to process (DATASET_ID). TASK_ID identifies the set of instructions that are expected to be executed when the associated task is run. DATASET_ID identifies the set of memory locations that are expected to be either read from or written to or both during the execution of a task. The type of a task is defined by the set of instructions.

Different tasks types have different characteristics, one of them being the usage patterns of instructions and data. Therefore, the relative importance of data and instruction reuse may be different for different tasks. In the arrangements presently disclosed, two weight values are associated with each task type: $w_i$ and $w_d$. The weight $w_i$ reflects the importance of instruction reuse for that task, while the weight $w_d$ reflects the importance of data reuse for that task. A task with higher $w_i$ than $w_d$ would gain more benefit from reusing instructions, while a task with lower $w_i$ than $w_d$ would gain more benefit from reusing data. By comparing the weights, it is possible to determine how to match a thread to a task, or vice versa, for best possible cache reuse. For example, if $w_i=10$ and $w_d=5$ for task T, instruction reuse is more important than data reuse for that task T.

These weight values can be set either statically or dynamically. The static determination of the weight values is done a priori, while the dynamic determination of weights for the task types in the program is done at run time and can change to reflect the current state of the computing system. For example, a larger dataset might warrant the increase of the data reuse weight value $w_d$ for a task for which the instruction reuse is generally regarded as more important.

A thread is deemed suitable to execute a given task and a task is deemed suitable to be executed on a given thread, if such thread-task pairing is likely to lead to cache reuse.

Figure 10A:
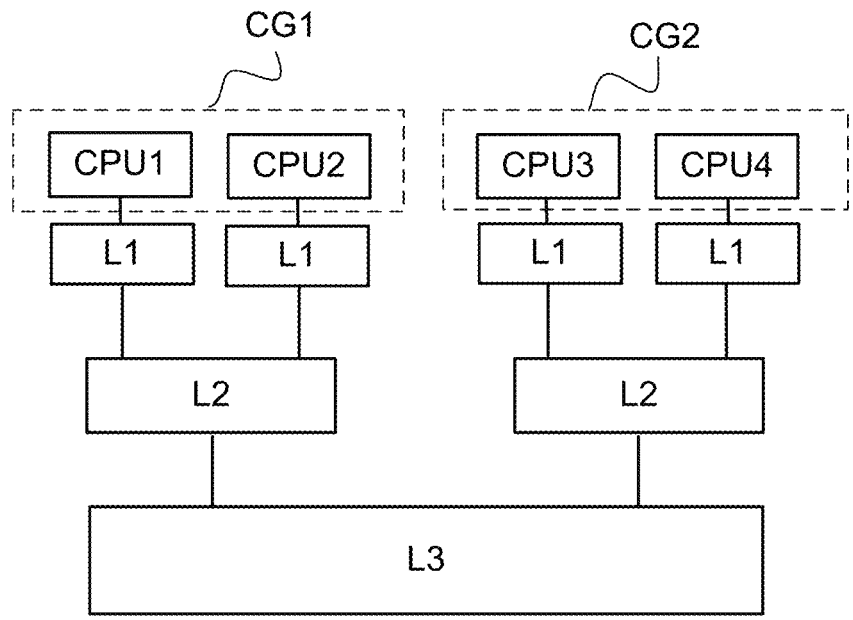
FIGS. 10A and 10B illustrate exemplary configurations for L2 and L3 cache optimisation respectively.

When two or more CPUs share the same cache unit, the threads executed on these CPUs are referred in this document as a computational group (CG). All threads in a CG have equal access to the cache physically shared by the corresponding CPUs. An exemplary implementation is described as applied to L2 caches, as specifically depicted in FIG. 10A, but the approaches disclosed herein can be applied to any cache level, such as the L3 optimisation of FIG. 10B.

In general, one or more threads can be assigned to a CPU, but in a preferred implementation, only one thread is assigned to a CPU. This assignment does not change throughout execution, such that a given thread always runs on the same CPU, a concept known in the art as thread affinity.

The arrangements presently disclosed address the main disadvantages of the prior art by scheduling tasks to threads at the task level. A task is assigned to the thread that will result in the reuse of the most important kind of cached content (instructions or data) for that particular task. For this reason, the type of the task, which represents the task's potential reuse of instructions and data, is important. Conversely, the prior art reuses cached content at the machine language level, often by monitoring the usage of cache lines precisely. The prior art therefore imposes more overhead on program execution than the arrangements presently disclosed, and often also requires specialised hardware.

FIG. 1 shows a schematic block diagram of a multi-processor Computer System 100 with at least one level of memory in which the arrangements presently disclosed may be implemented. The Computer System 100 may be a stand-alone computer such as modern desk-top computers such those akin to IBM-PC's and compatibles, Sun SPARC™, Apple Mac™ or a like computer systems. The Computer System 100 may alternatively be part of, or wholly implement, a special-function apparatus such as a printer, imaging system, control system or the like. The number of CPUs on each processing device or chip, the number of caches and their hierarchical organisation, and other computer system components, can vary widely. The Computer System 100 has a number of Processing Units 150, Memory 120, Peripheral Device Interface 190, a hard disk drive system (HDD) 192 and read-only memory (ROM) 194, all interconnected via a Bus 140 and associated respective connections 141, 142, 143, 144 and 145 as illustrated. The peripheral device interface 190 permits interconnection of the computer system 100 with other systems including communication networks, other computers, devices such as printers and displays, and control devices such as keyboards and mouse pointing devices (not illustrated) via an optional connection 195. The Processing Units 150 and the Memory 120 have a dedicated connection 145, separate from the bus 140. The memory 120 as depicted in FIG. 1 represents an amalgam of various memory components and types used in typical computer systems. The memory 120 may therefore include L1 cache and L2 cache incorporated in microprocessor/microcontroller devices, L3 cache directly coupled to such devices, and so-called "main" memory, all of which are typically implemented using semi-conductor-based random access memory (RAM) and, for the RAM not integral with the processing units 150, as dedicated RAM devices. The Computer System 100 may include other memory, this being represented by the HDD system 192, the ROM memory 120 and other devices, such as optical disk drives, PCMCIA drives, USB drives and the like, not illustrated for the sake of clarity, which traditionally exclusively couple to the Bus 140 and not directly to the processing units 150.

In a typical computer system, the ROM 194 stores basic processes that enable the computer 100 to turn on and execute fundamental operating processes, including the booting of an operating system 122 of the computer 100, generally by copying the operating system 122 from permanent storage in the HDD 192 to the memory 120 for execution by the processing units 150. The operating system 122 provides for fundamental control of functions of the computer including low-level operational functions such as memory management, of which cache memory management forms a part. Thus, (higher-level) applications that may execute on the computer system can avail themselves of the default memory management functions offered by the operating system. However, some (higher-level) applications prefer to assert their own controlling influence over low-level operations, generally to achieve performance optimised or otherwise suited to the particular application. Such applications thereby provide or are accompanied by specific software applications configured to modify the low-level operation of the computer system 100 as desired by the higher-level application.

Typically, as seen in FIG. 1, a Controlling program 130 is generally stored in the HDD 192 and copied from the HDD 192 to reside in the Memory 120 whereupon the controlling program 130 is executable upon one or more of the threads associated with CPUs 171, 172, 181 and 182 of the Processing Units 150. In the present disclosure, the controlling program 130 is typically an application program executable on the computer system 100 for a particular purpose and includes a software component configured according to the present disclosure for implementing an alternative approach to managing the cache memory of the computer system 100 to reduce cache miss rates and optimising cache reuse. In some implementations, the cache management processes presently described may be incorporated as a default process within the operating system 122. The particular purpose of the Controlling Program 130 may vary widely, but can include image processing applications such as rendering, rasterising, compositing and the like, as well as print tasks generated by printing applications. Other applications may include word processing and desk-top publishing applications, financial applications, games, communications, data processing, monitoring, control systems, amongst many others.

As illustrated in the example of FIG. 1, the CPUs 171, 172, 181, and 182 of the processing units 150 are split into two computation groups (CGs)—CG 160 and CG 165.

Figure 2:
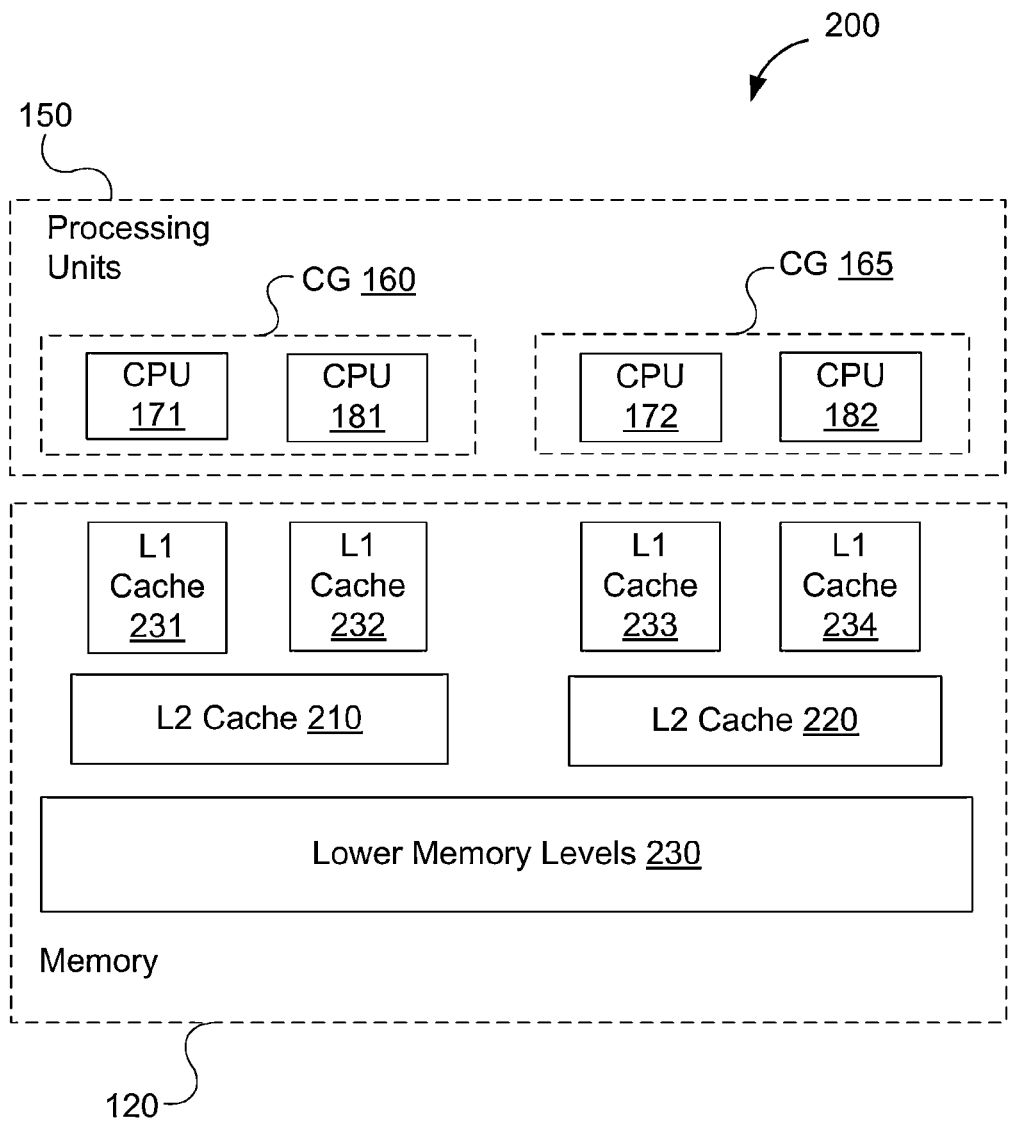
FIG. 2 is a schematic block diagram illustrating an example of the processing units and memory unit of the computer system of FIG. 1.

FIG. 2 illustrates an exemplary arrangement 200 of Processing Units 150 and a hierarchical configuration of the Memory 120 of FIG. 1. In this particular arrangement 200, a CG consists of those threads associated with CPUs that use the same L2 cache, and is mirrored by the configuration of FIG. 10A where the L1 cache is configured with the corresponding CPU generally on the same semiconductor device. As such, FIG. 2 shows two CGs, being CG 160—for the threads of CPU 171 and CPU 181 which share L2 Cache 210, and CG 165—for the threads of CPU 172 and CPU 182 which share L2 Cache 220. In this configuration, implementation of the arrangements to be described provides for optimisation of the L2 cache.

Each CPU shown in FIG. 1 has a corresponding dedicated L1 cache, which may be either unified cache or may be made of two separate physical units of dedicated data and instruction caches. FIG. 2 depicts CPU 171 having L1 Cache 231, CPU 181 having L1 Cache 232, CPU 172 having L1 Cache 233 and CPU 182 having L1 Cache 234.

Similarly, the L2 Cache 210 and the L2 Cache 220 can be either unified or can have physically separate hardware units of dedicated data and instruction caches. In the various implementations presently described, the L2 caches 210 and 220, regardless of their physical arrangement are each viewed as one logical cache unit. The Lower Memory Levels 230 component represents the rest of the memory hierarchy, which are the L3 cache and the main memory in this exemplary hardware configuration. In a typical implementation of the arrangement of FIG. 2, each L1 cache is physically located on the same integrated circuit chip as the corresponding CPU, each L2 is a dedicated cache memory device directly physically connected to the corresponding CPU devices, and the L3 cache is a group of virtual locations physically partitioned within main semiconductor random access memory (RAM) of the Computer System 100.

Figure 3:
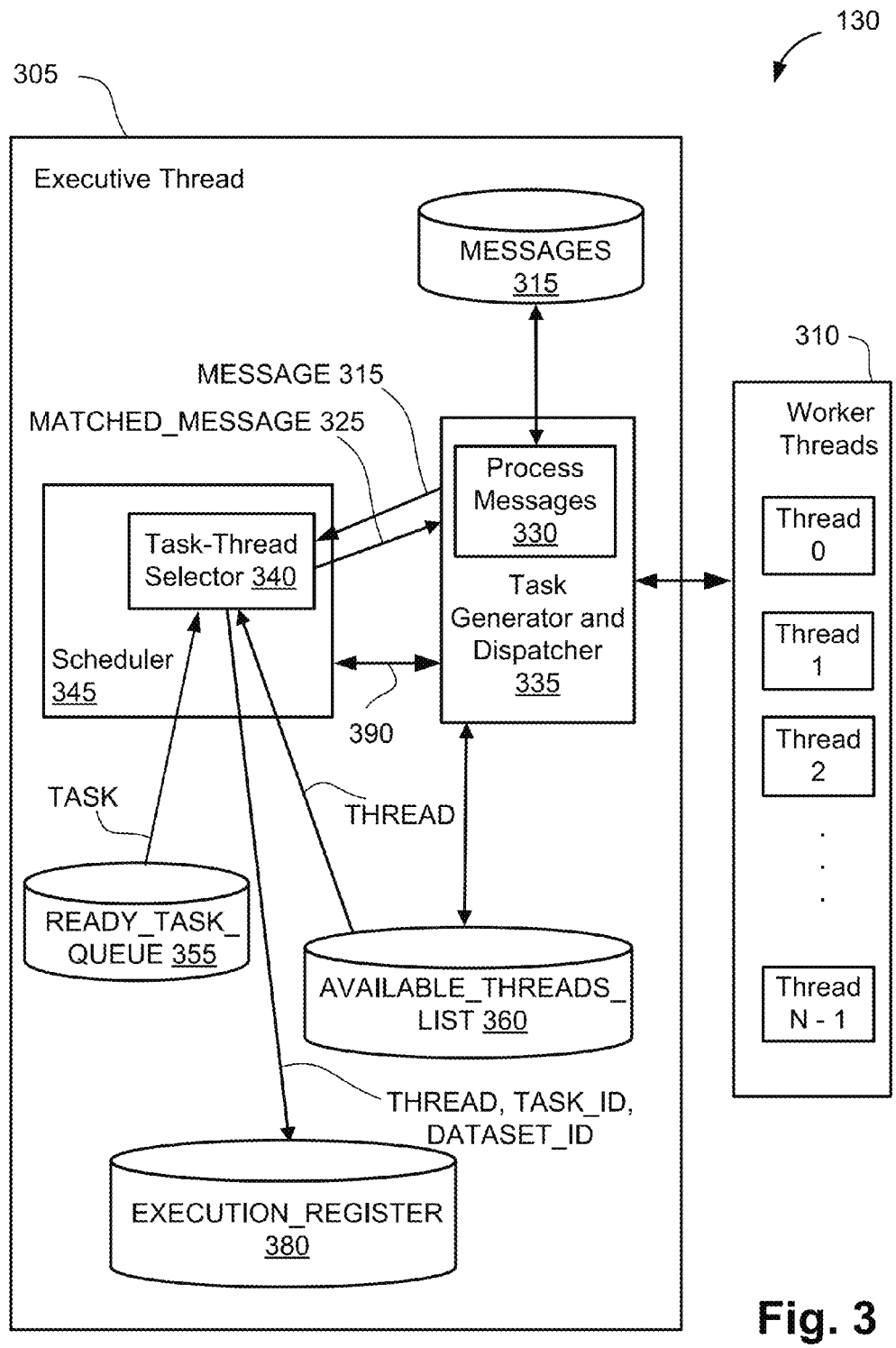
FIG. 3 is a schematic block diagram illustrating an exemplary architecture for the Controlling Program 130 of FIG. 1.

FIG. 3 illustrates one implementation of the Controlling Program 130 which includes an Executive Thread 305 component and a Worker Threads 310 component. The Executive Thread 305 component initiates and oversees the execution of Controlling Program 130. The Worker Threads 310 component contains a plurality of threads (Thread 0, Thread 1, Thread 2 . . . ) and runs tasks on these threads as directed by the Executive Thread 305 component. For example, where the Controlling Program 130 is a printer driver having associated print tasks such as rendering and compositing, the Executive Thread 305 may represent those management operations of the printer driver, including cache management, that give effect to actual print processing, which is performed by the worker threads 310 which implement specific tasks such as rendering, and/or significant components thereof, such as edge tracking, compositing and the like.

The arrangements presently described are predicated upon the matching of specific tasks to specific threads, with any thread being restricted to execute within a specific computational group (CG). This provides that the thread and task combination is inherently associated with the same cache memory upon each calling, thereby potentially reducing cache miss rates.

The Executive Thread 305 includes a Task Generator and Dispatcher 335 which is responsible for creating tasks to carry out processing, and for the dispatch of those tasks to Worker Threads 310 for execution. On creation, tasks are assigned a type (TASK_ID) to identify the set of instructions that will be executed, a DATASET_ID to identify the data that the task will be processing and a task scheduling priority, among other attributes.

A Process Messages 330 component is responsible for processing all messages passed within the Controlling Program 130, and a Scheduler 345 is responsible for scheduling tasks for execution. The Scheduler 345 has a Task-Thread Selector 340 responsible for matching tasks to threads, a function described later in detail.

The Executive Thread 305 also has the following storage components: READY_TASK_QUEUE 355, AVAILABLE_THREADS_LIST 360, MESSAGES 315 and EXECUTION_REGISTER 380, the function and content of each of which will now be described in turn.

The READY_TASK_QUEUE 355 is a queue data structure containing all tasks in Controlling Program 130 that are ready to be dispatched for execution.

The AVAILABLE_THREADS_LIST 360 stores a list of identities (IDs) of the threads assigned to Controlling Program 130. The threads in the list 360 represent a subset of all the worker threads 310 associated with the Controlling Program 130, being those that are currently idle, and thus not allocated to the execution of a task. This list 360 is maintained in order to keep track of the computational resources available to Controlling Program 130 at any given time during execution.

The MESSAGES 315 store stores the messages passed between the components of the Controlling Program 130.

Each message has a type such as MATCH_THREAD, MATCH_TASK, START_TASK and TASK_FINISHED to signify its purpose. The MESSAGE store 315 can provide messages that are passed from the Process Messages 330 component to the Task-Thread Selector 340 component, which are of either MATCH_THREAD or MATCH_TASK message type.

Figure 4:
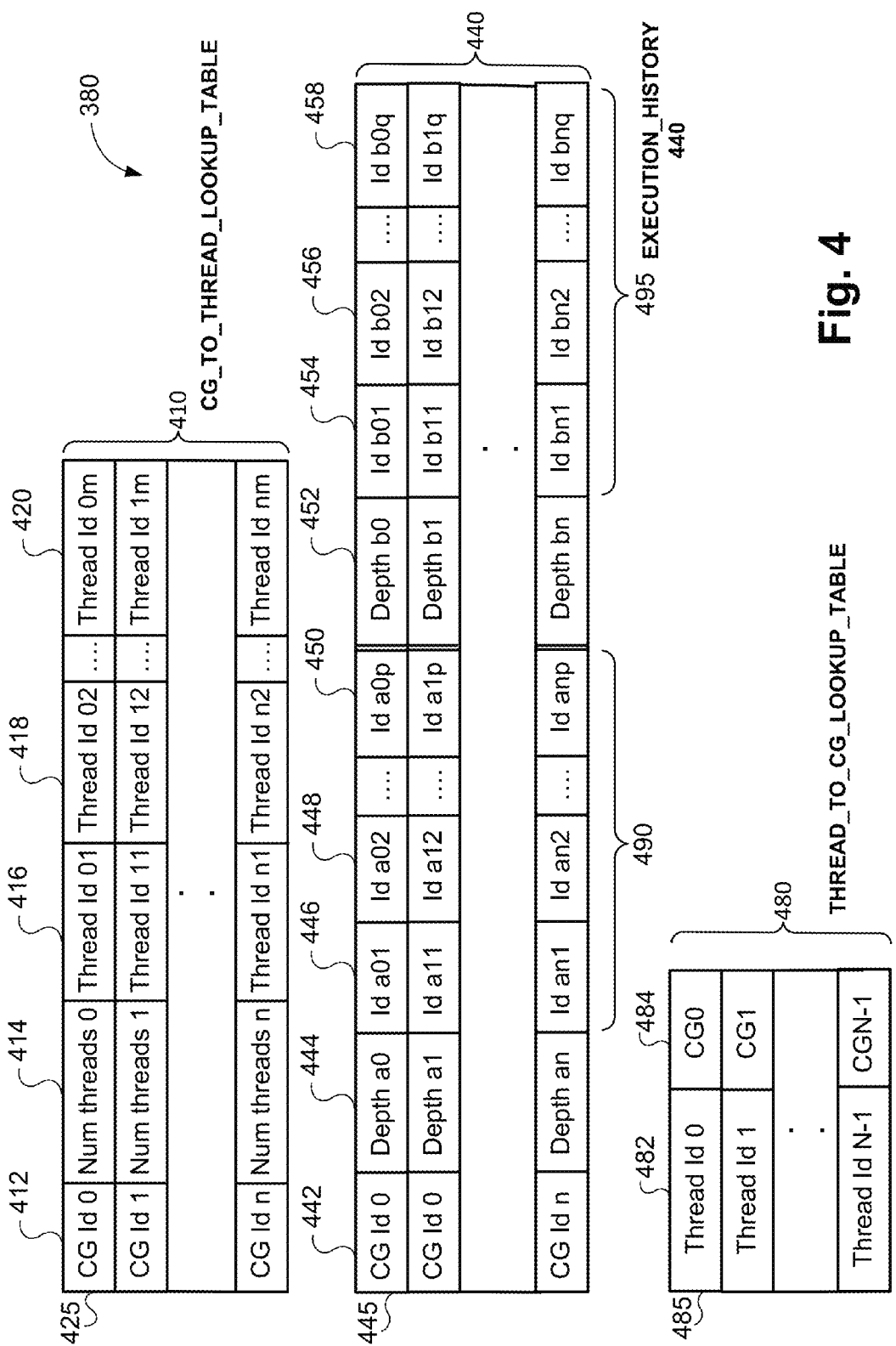
FIG. 4 illustrates the memory layout of the EXECUTION_REGISTER 380 storage component of FIG. 3.

The EXECUTION_REGISTER 380 keeps track of the collective execution history of threads in the CGs. The store 380 preferably has three structures, as illustrated in FIG. 4. A structure CG_TO_THREAD_LOOKUP_TABLE 410 contains the CG IDs and IDs of the threads in each CG, in a number of records 425. Thus the table 410 represents subsets of threads associated with a corresponding CG and, as such, a corresponding cache memory. The records 425 have a field 412 that stores the CG ID, a field 414 that stores the number of threads in that CG and the rest of the fields in the record, 416, 418 and 420 illustrate the storing of the threads in that CG.

A second structure in the EXECUTION_REGISTER 380 is an EXECUTION_HISTORY 440 structure, which stores the execution history for each CG, being recorded in an individual record 445 for each CG.

Each record 445 has a TASK_HISTORY_QUEUE 490 which is a queue data structure that contains the task IDs of the tasks that were executed most recently on the threads in a corresponding CG, thereby representing a task history of the CG. Each record 445 also has a DATA_HISTORY_QUEUE 495, being a queue data structure that contains the dataset IDs of the tasks that were executed most recently on the threads in a CG and which represents a data history of the CG. In short, the EXECUTION_HISTORY 440 structure stores information identifying main memory regions that were most recently used.

A Field 442 in the record 445 stores the CG ID. Fields 446, 448 and 450 illustrate the encoding of the TASK_HISTORY_QUEUE 490. Fields 454, 456 and 458 illustrate the encoding of the DATA_HISTORY_QUEUE 495. Fields 444 and 452 store the number of entries in the TASK_HISTORY_QUEUE 490 and DATA_HISTORY_QUEUE 495 respectively. The depth of these queues, collectively representing the execution history of a thread, depends on both the size of the cache the use of which is being optimised and the characteristics of the tasks in the Controlling Program 130. Examples of the characteristics of the tasks in the Controlling Program 130 are the average code size of the tasks and the average size of the most frequently executed instructions in the code of the task. The characteristics of the tasks in the Controlling Program 130, such as the code sizes of the tasks, are used to pre-determine the depth of the queues or change the queue depth during the execution of Controlling Program 130. In one implementation therefore, the execution history has a size dependent on the code sizes of most commonly executed instructions associated with the tasks executed by the threads. In another implementation, the execution history has a size dependent on the size of the data used by the tasks executed by the threads. That queue depth value can be different for each queue and/or CG and can be either set before the Controlling Program 130 is started, or can be varied dynamically throughout execution of the Controlling Program 130. Both the CG_TO_THREAD_LOOKUP_TABLE 410 and the EXECUTION_HISTORY 440 structures contain one record for each CG.

A third structure in the EXECUTION_REGISTER 380 is a THREAD_TO_CG_LOOKUP_TABLE 480 structure which stores a lookup table from thread ID in a field 482 to the CG to which the thread belongs in field 484, in a record 485 corresponding to the thread. The structure 480 contains N records, where N is the number of threads in the Worker Threads 310 component of Controlling Program 130. The structure 480 complements a basic aspect of the table 410 discussed above.

The Scheduler 345 component is responsible for scheduling tasks on threads for execution and receives a description of the generated tasks from the Task Generator and Dispatcher 335 component via a message channel 390. Scheduler 345 maintains the READY_TASK_QUEUE 355 in an order determined by the employed scheduling algorithm. Any suitable scheduling algorithm known in the art may be employed by the scheduler 345. According to preferred implementation, the tasks in the READY_TASK_QUEUE 355 are kept in descending task priority order, i.e. high priority tasks are at the front of the queue and low priority tasks are at the end of the queue. Task priority is assigned on task creation, which may be later increased or decreased during execution. The Task-Thread Selector 340 component matches tasks ready to run with threads from the AVAILABLE_THREADS_LIST 360. The functionality of Task-Thread Selector 340 is described in detail next with reference to FIG. 5.

Figure 5:
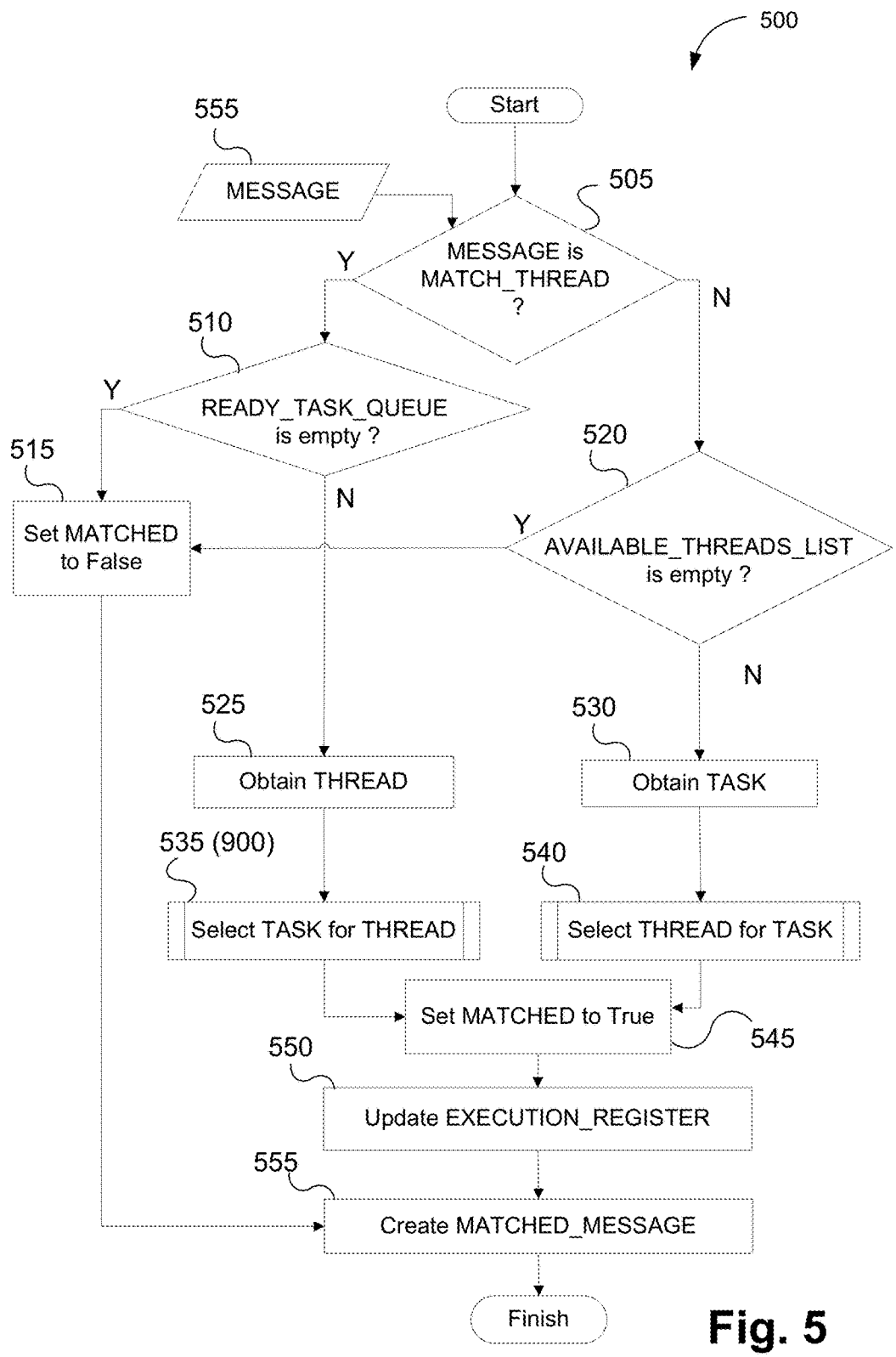
FIG. 5 is a data flow diagram illustrating a process for matching tasks to threads in response to received MATCH_THREAD and MATCH_TASK messages.

FIG. 5 shows a process 500 executed by the scheduler 345 for determining if a given task can be matched with an available thread or a given thread is ready to run task, respectively. Initially a MESSAGE 315 is passed from the dispatcher 335 to the scheduler 345. The MESSAGE 315 is of either MATCH_THREAD type or MATCH_TASK type, as only these two message types are passed from the Process Messages 330 component of the dispatcher 335 to the Task-Thread Selector 340 component of the scheduler 345. The MESSAGE 315 comprises the message type and the thread or the task that has to be matched. For example, (MATCH_THREAD, "0") is a message request to match thread with ID "0" with a suitable task that is ready to be executed. For example, the message request (MATCH_TASK, [DL,7]) is a request to find a suitable thread to run the task defined by the type "DL" indicated by the request and the dataset "7" to be processed by the thread.

The scheduler 345, in a decision step 505, determines whether the MESSAGE 315 is of the type MATCH_THREAD. If so, the process 500 proceeds, via step 510, to determine a suitable task to run on the thread passed in MESSAGE 315. If MESSAGE 315 is not of type MATCH_THREAD i.e., it is of type MATCH_TASK, the processing continues, via step 520, by selecting a thread suitable to execute the task passed in MESSAGE 315. These two cases are described next in turn.

If the scheduler 345, in decision step 505, determines that MESSAGE 315 is of type MATCH_THREAD, the scheduler 345 proceeds to decision step 510. In step 510, the scheduler 345 checks if the READY_TASK_QUEUE 355 is empty. If the READY_TASK_QUEUE 355 is empty, the scheduler 345 proceeds to processing step 515 and sets the Boolean parameter MATCHED to False. Next, the scheduler 345, in step 555, creates the message MATCHED_MESSAGE 325 which, as seen in FIG. 3, is sent to the Process Messages 330 component of the Executive Thread 305 as a reply to MESSAGE 315 which requested the selection of either task or a thread.

MATCHED_MESSAGE 325 contains the value of MESSAGE and the pair (THREAD, TASK). In the case where step 515 is encountered, as no match is possible, the value of TASK for the given THREAD is set to Null in MATCHED_MESSAGE 325. Process 500 ends with step 555.

If there is at least one task in the READY_TASK_QUEUE 355 as tested in step 510, THREAD is extracted from MESSAGE 315 in step 525. Next, a task to run on THREAD is selected in a process 535, which is described in detail later with reference to FIG. 6. Processing proceeds to step 545.

If, in step 505, the scheduler 345 of a thread 305 in the processing unit 150 determines that MESSAGE 315 is not of type MATCH_THREAD, the process 500 continues to decision step 520, where the scheduler 345 checks whether the AVAILABLE_THREADS_LIST 360 is empty. If the AVAILABLE_THREADS_LIST 360 is empty, the Boolean parameter MATCHED is set to False in step 515. Next, the scheduler 345, in step 555, creates the message MATCHED_MESSAGE 325. MATCHED_MESSAGE 325 is sent to the Process Messages 330 component as a reply to MESSAGE 315 which requested the selection of either a task or a thread. In this case, again, as no match is possible, the value of THREAD for the given TASK is set to Null in MATCHED_MESSAGE 325, and the process 500 ends with step 555.

Returning to step 520, if there is at least one available thread, processing continues with extracting TASK from MESSAGE 315 in step 530. Next, the scheduler 345 executes a process 540 to select a thread to run TASK, as described in detail later with reference to FIGS. 7A to 7C.

Both processes 535 and 540, executed for the message types MATCH_THREAD and MATCH_TASK respectively, always result in obtaining a pair (THREAD, TASK). Therefore, in a following step 545, the Boolean parameter MATCHED is set to True and then in step 550, the EXECUTION_REGISTER 380 is updated by adding the TASK_ID and the DATASET_ID of TASK to the execution history queues 490 and 495 for the CG of THREAD in the EXECUTION_HISTORY 440 structure. The TASK_ID and the DATASET_ID of TASK are added to the front of queues 490 and 495 respectively, and all other entries are shifted towards the tail of the queue with the last entry (the oldest) in each queue being deleted.

Process 500 ends with step 555 in which the MATCHED_MESSAGE is created with the value of the Boolean parameter MATCHED (having the value True in the case following from step 545) and the pair (THREAD, TASK).

Figure 6:
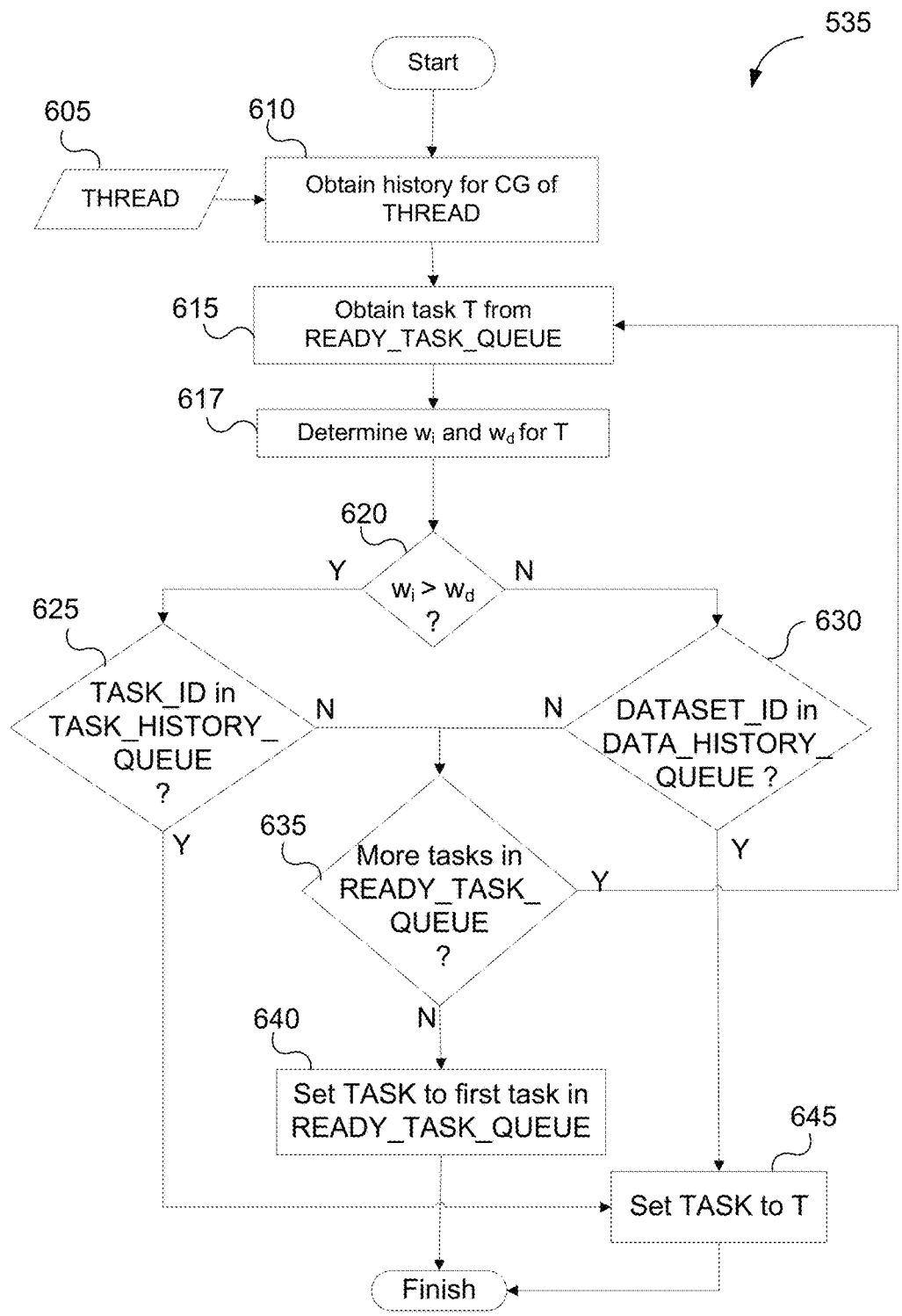
FIG. 6 is a data flow diagram illustrating a process for selecting a task from the READY_TASK_QUEUE to run on a given thread.

FIG. 6 illustrates the process 535 of selecting a task from the READY_TASK_QUEUE 355 to run on a given thread, THREAD 605. The process 535 starts with step 610, where the scheduler 345 obtains the history of the CG of THREAD 605. This is achieved by accessing the record for THREAD 605 from the THREAD_TO_CG_LOOKUP_TABLE 480 and obtaining a field 484 specifying the CGID to which the THREAD 605 belongs. Next, from the EXECUTION_HISTORY 440 structure, the execution history comprising the task history read from the TASK_HISTORY_QUEUE 490 and the data history read from the DATA_HISTORY_QUEUE 495 for that CG, is accessed in step 610. In obtaining step 615, the scheduler 345 starts a process of iterating through the entries in the READY_TASK_QUEUE 355 until a task suitable to run on THREAD 605 is found. In step 615, starting from the head of the READY_TASK_QUEUE 355, a task T is obtained by the Task Generator and Dispatcher 335. Step 617 determines the weighting of the set of instructions $w_i$ and the weightings of the set of data $w_d$ for the task T. The weightings determine the importance of instruction reuse or data reuse for a task. This weight determination can be achieved in various ways, one being, but not limited to, using a lookup table of pre-determined values for $w_i$ and $w_d$ for all task types in the Controlling Program 130 stored in Memory 120. The scheduler 345, in decision step 620, then checks if $w_i$ is greater than $w_d$. If that is the case, then instruction reuse is more important than data reuse for the task T, and the process 535 continues to a decision step 625 which checks if TASK_ID of TASK is in the TASK_HISTORY_QUEUE 490 of the CG of THREAD 605. If that is the case, task T is suitable. In step 645, the scheduler 345 sets TASK to T, with which process 535 ends.

If step 620 determines that $w_i$ is not greater than $w_d$, then instruction reuse is no more important than data reuse for task T, and step 630 follows to check if the DATASET_ID associated with the task T is in the DATA_HISTORY_QUEUE 495 for the CG of THREAD 605. If the DATASET_ID associated with the task T is found in DATA_HISTORY_QUEUE 495 of the CG of THREAD 605, then task T is a suitable task, and step 645 follows where the scheduler 345 sets TASK to T, with which process 535 ends.

The process of obtaining a task T from the READY_TASK_QUEUE 355, and checking if either the TASK_ID or DATASET_ID of the task T are in the execution history for the CG of THREAD 605 in FIG. 6, is repeated for each task in the READY_TASK_QUEUE 355 until a task with either matching TASK_ID (step 625) or DATASET_ID (step 630) is found, or until the end of the queue is reached, as tested in step 635.

When there are no more tasks in the READY_TASK_QUEUE 355, the processing loop formed by steps 615 and 635, processing proceeds to step 640 which sets TASK to the first task in the READY_TASK_QUEUE 355. The task at the head of the queue is the highest priority task and when cache content reuse cannot be achieved, the task at the head of the queue is dispatched for execution. Process 535 ends after step 640.

Figure 7A:
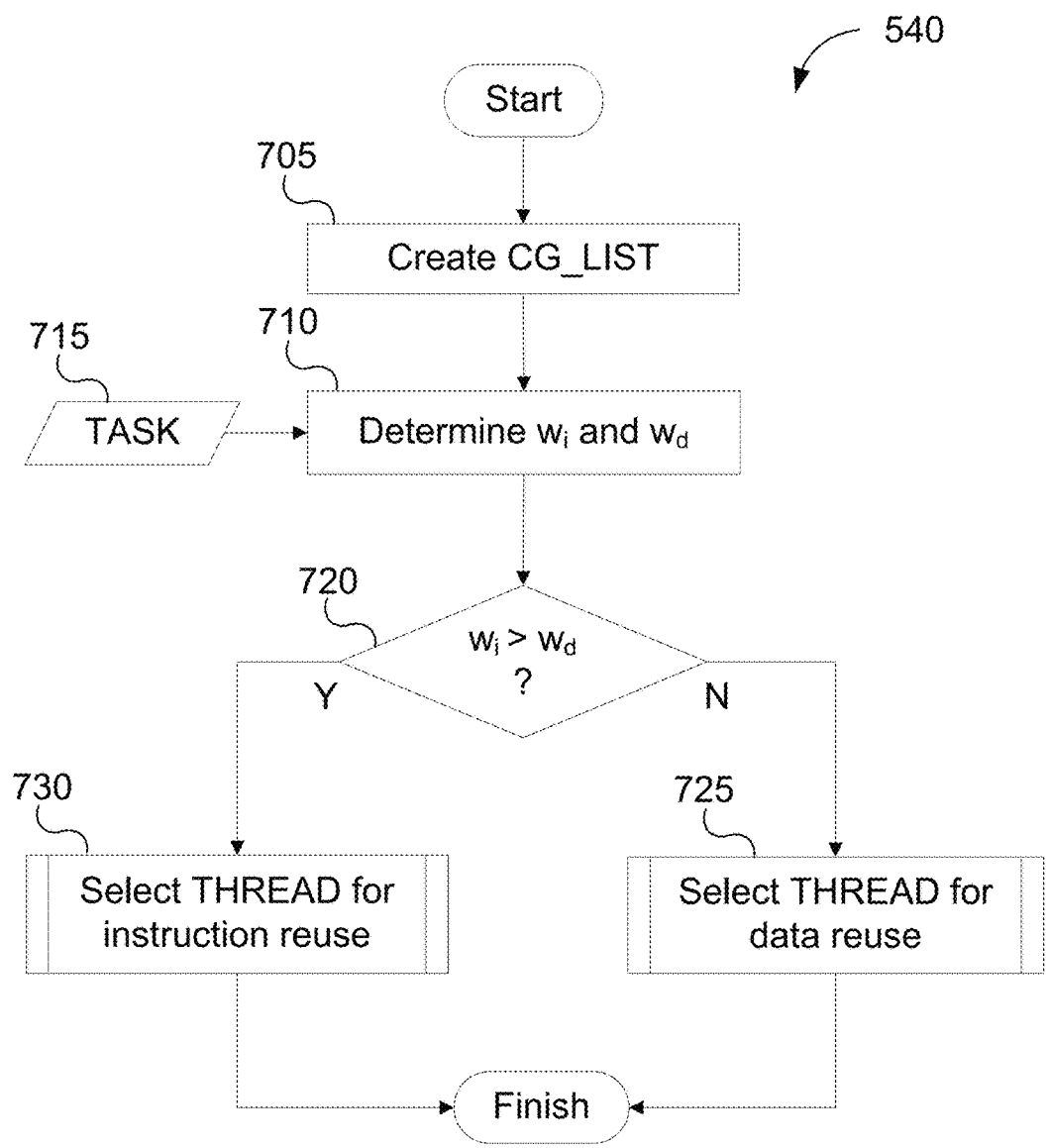
FIG. 7A is a data flow diagram illustrating a process for selecting a thread from the AVAILABLE_THREADS_LIST to execute a given task.

FIG. 7A illustrates the process 540 of selecting a thread to execute a given task, TASK 715. The process 540 starts with step 705 where a list of CG IDs (CG_LIST) is created from the execution history 440 thus representing an execution history of the subset of threads forming the CG. Each entry in the CG_LIST has at least one available thread. An iterator to iterate through CG_LIST is also setup in step 705. In step 710, the scheduler 345 determines the weighting of the set of instructions $w_i$ and the weighting of the set of data $w_d$ for TASK 715. This can be achieved in various ways, one being, but not limited to, using a lookup table of pre-determined values for $w_i$ and $w_d$ for all task types in the Controlling Program 130. Decision step 720 checks if $w_i$ is greater than $w_d$. In the event where $w_i$ is greater than $w_d$, then instruction reuse is more important than data reuse for TASK 715 and processing continues with a process 730, described in detail later with reference to FIG. 7C.

If the scheduler 345, in step 720, determines that $w_i$ is not greater than $w_d$, then instruction reuse is no more important than data reuse for TASK 715, therefore processing continues with a process 725, described in detail next with reference to FIG. 7B.

Figure 7B:
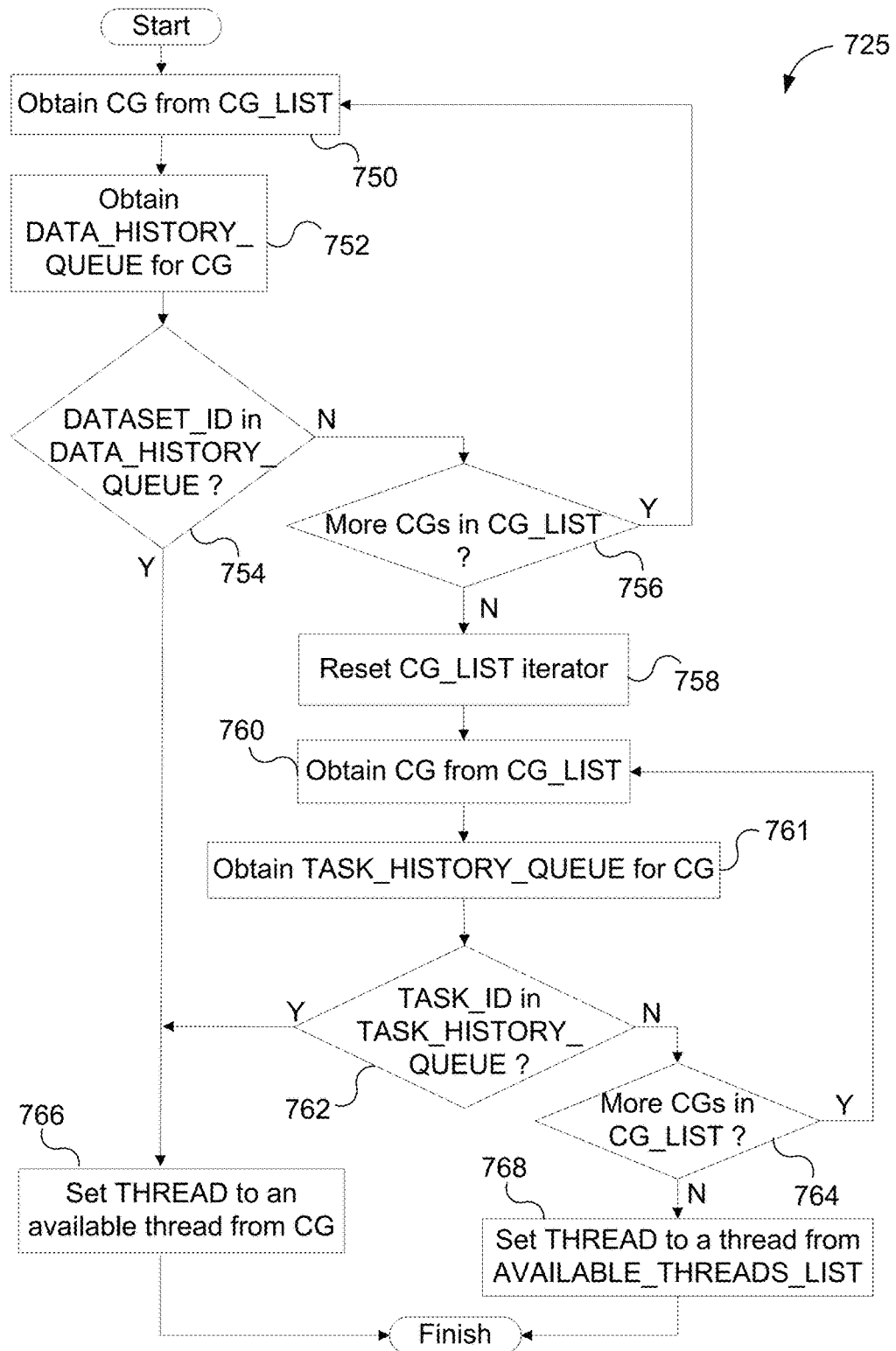
FIG. 7B is a data flow diagram illustrating a process for selecting a thread from the AVAILABLE_THREADS_LIST to execute a given task when data reuse is important.
Figure 7C:
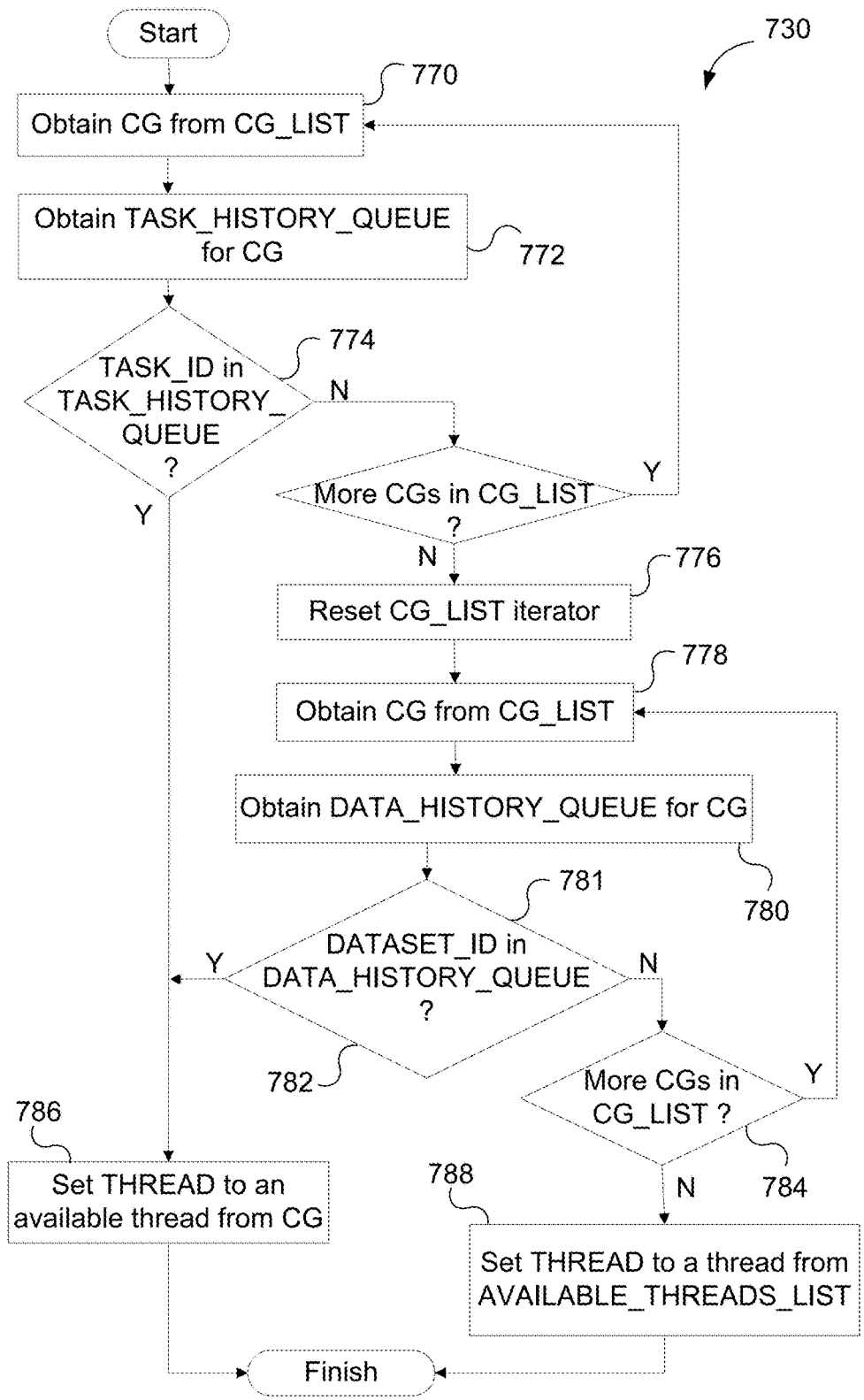
FIG. 7C is a data flow diagram illustrating a process for selecting a thread from the AVAILABLE_THREADS_LIST to execute a given task when instruction reuse is important.

The processes of steps 725 and 730 shown in FIGS. 7B and 7C select a particular thread from a subset of all idle (available) threads that are suitable to execute the TASK 715 based on the execution history of the threads and the determined weightings for the instructions and data associated with the task ($w_i, w_d$).

FIG. 7B illustrates the process 725 of selecting a thread suitable to run TASK 715 when data reuse is more important than instruction reuse for TASK 715. The process 725 thus places reliance upon the data history associated with the TASK 715 and starts with step 750, where the scheduler 345 obtains a CG ID from the CG_LIST using the iterator, both created earlier in step 705. Then, the scheduler 345, in step 752, obtains the data history for that CG. This is achieved by using the CG ID to access the DATA_HISTORY_QUEUE 495 for that CG.

The process 725 continues with decision step 754, with the scheduler 345 determining if the DATASET_ID associated with TASK 715 is found in the DATA_HISTORY_QUEUE 495 for that CG. If that is the case, step 766 then selects an available thread from the CG to be used to run TASK 715. Any thread that is currently idle can be selected by means including, but not limited to, applying any load-balancing algorithm known in the art.

If step 754 determined that DATASET_ID assigned to TASK 715 was not found in DATA_HISTORY_QUEUE 495 for that CG, processing proceeds to a decision step 756. Step 756 determines whether there are more CGs in the CG_LIST whose data history has not been checked yet. If that is the case steps 750, 752, and 754 are repeated until either DATASET_ID of TASK 715 is found in the DATA_HISTORY_QUEUE 495 for a CG in the CG_LIST, or there are no more entries in CG_LIST left to check.

When there are no more entries in CG_LIST left to check, as determined at step 756, the process 725 proceeds to step 758 in which the iteration of CG_LIST is started from the beginning by resetting the CG_LIST iterator, since data reuse cannot be achieved for TASK 715 on any the currently available threads. The entries in the TASK_HISTORY_QUEUE 490 of the CG IDs in the CG_LIST will be checked against the TASK_ID of TASK 715 in view of achieving instruction reuse.

In step 760, the scheduler 345 obtains a CG ID from CG_LIST. In step 761, the scheduler 345 obtains the task history of that CG regarding the set of instructions the threads in that group have executed. This is achieved by accessing the TASK_HISTORY_QUEUE 490 in the EXECUTION_HISTORY 440 structure for that CG.

In decision step 762, the scheduler 345 checks if TASK_ID of TASK 715 is found in the TASK_HISTORY_QUEUE 490 for that CG. Subject to that being the case, the scheduler 345, in step 766, selects an available worker thread from Worker Threads 310 assigned to the CG to be used to run TASK 715. Any thread that is currently idle can be selected by means including, but not limited to, applying any load-balancing algorithm known in the art.

When in step 762 TASK_ID is not found in the TASK_HISTORY_QUEUE 490 of that CG, steps 764, 760, 761 and 762 are repeated until either TASK_ID is found in the TASK_HISTORY_QUEUE 490 for a CG in the CG_LIST, or there are no more entries in CG_LIST left to check as determined at decision step 764. When there are no more entries left to check, step 768 sets THREAD to any idle worker thread from Worker Threads 310 identified by the subset represented in from the AVAILABLE_THREADS_LIST 360. The selection of an idle thread is made by means including, but not limited to, applying any load-balancing algorithm known in the art. Process 725 ends with step 768 and demonstrates selection of a suitable thread from the subset of the list 360 to process TASK 715 when data reuse is more important than instruction reuse for TASK 715. As mentioned before, the selection of the subset of threads is based on the threads' execution history and the determined weighting for instruction reuse or data reuse associated with the task.

FIG. 7C illustrates the process 730 of selecting a thread suitable to run TASK 715 as seen in FIG. 7A when instruction reuse is important for TASK 715. The process 730 thereby relies upon the instruction history associated with the TASK 715 and starts with step 770 obtaining a CG ID from the CG_LIST that was created in step 705. Step 772 obtains the history for that CG regarding the instructions the threads in that group have executed recently. This is achieved by using the CG ID to access the TASK_HISTORY_QUEUE 490 for that CG.

The process 730 continues with decision step 774, wherein the scheduler 345 determines if the TASK_ID of TASK 715 is found in the TASK_HISTORY_QUEUE for that CG. If that is the case, the scheduler 345, in step 786, selects an available worker thread from Worker Threads 310 assigned to the CG to be used to run TASK 715. Any thread that is currently idle can be selected by means including, but not limited to, applying any load-balancing algorithm known in the art.

If TASK_ID of TASK 715 is not found in the TASK_HISTORY_QUEUE 490 of that CG, processing reaches decision step 776, wherein the scheduler 345 determines whether there are more CGs in the CG_LIST whose instruction history has not been checked yet. If that is the case, steps 770, 772, and 774 are repeated until either TASK_ID of TASK 715 is found in the TASK_HISTORY_QUEUE 490 for a CG in the CG_LIST, or there are no more entries in CG_LIST left to check.

When there are no more entries in CG_LIST to check (decision step 776), processing proceeds to step 778 in which the iteration of CG_LIST is started from the beginning in an attempt to reuse data, since instruction reuse cannot be achieved for TASK 715 on any of the currently available threads. To achieve reuse, the DATA_HISTORY_QUEUE 495 of the CGs in the CG_LIST is checked against the DATASET_ID of TASK 715. Step 780 obtains a CG ID from the CG_LIST.

In step 781, the scheduler 345 obtains the data history for that CG. This is achieved by using the CG ID to access the EXECUTION_HISTORY 440 structure where the data execution history is stored, the DATA_HISTORY_QUEUE 495.

In decision step 782, the scheduler 345 checks if the DATASET_ID of TASK 715 is found in the DATA_HISTORY_QUEUE 495 for that CG. If that is the case, the scheduler 345, in step 786, selects an available thread from the computational group CG to be used to run TASK 715. Any thread that is currently idle can be selected by means including, but not limited to, applying any load-balancing algorithm known in the art. Process 730 ends with step 786.

When DATASET_ID is not found in DATA_HISTORY_QUEUE 490 for that CG, steps 784, 780, 781 and 782 are repeated until either DATASET_ID is found in the DATA_HISTORY_QUEUE 495 for a CG in the CG_LIST, or there are no more entries in CG_LIST left to check, as determined by decision step 784. When there are no more entries left to check, step 788 sets THREAD to any thread from the AVAILABLE_THREADS_LIST 360 with which process 730 ends. The selection of an idle thread from the AVAILABLE_THREADS_LIST 360 is made by means including, but not limited to, applying any load-balancing algorithm known in the art. The process 730 also demonstrates selection of a suitable thread from the AVAILABLE_THREADS_LIST 360 to run TASK 715 when instruction reuse is important for TASK 715. Similarly, the selection of the subset of threads in the AVAILABLE_THREADS_LIST 360 is based on the threads' execution history and the determined weighting for instruction reuse or data reuse associated with the task.

The processing arrangements presently described use knowledge of the characteristics of the tasks created and executed by Controlling Program 130 stored in memory 120 in order to suitably match threads to tasks for maximum cache content reuse between tasks executed on CPUs of the same computational group. The simplicity of the decisions that have to be made, and the limited execution history kept, allows for minimal overhead to be incurred by the Task-Thread Selector 340.

Figure 8:
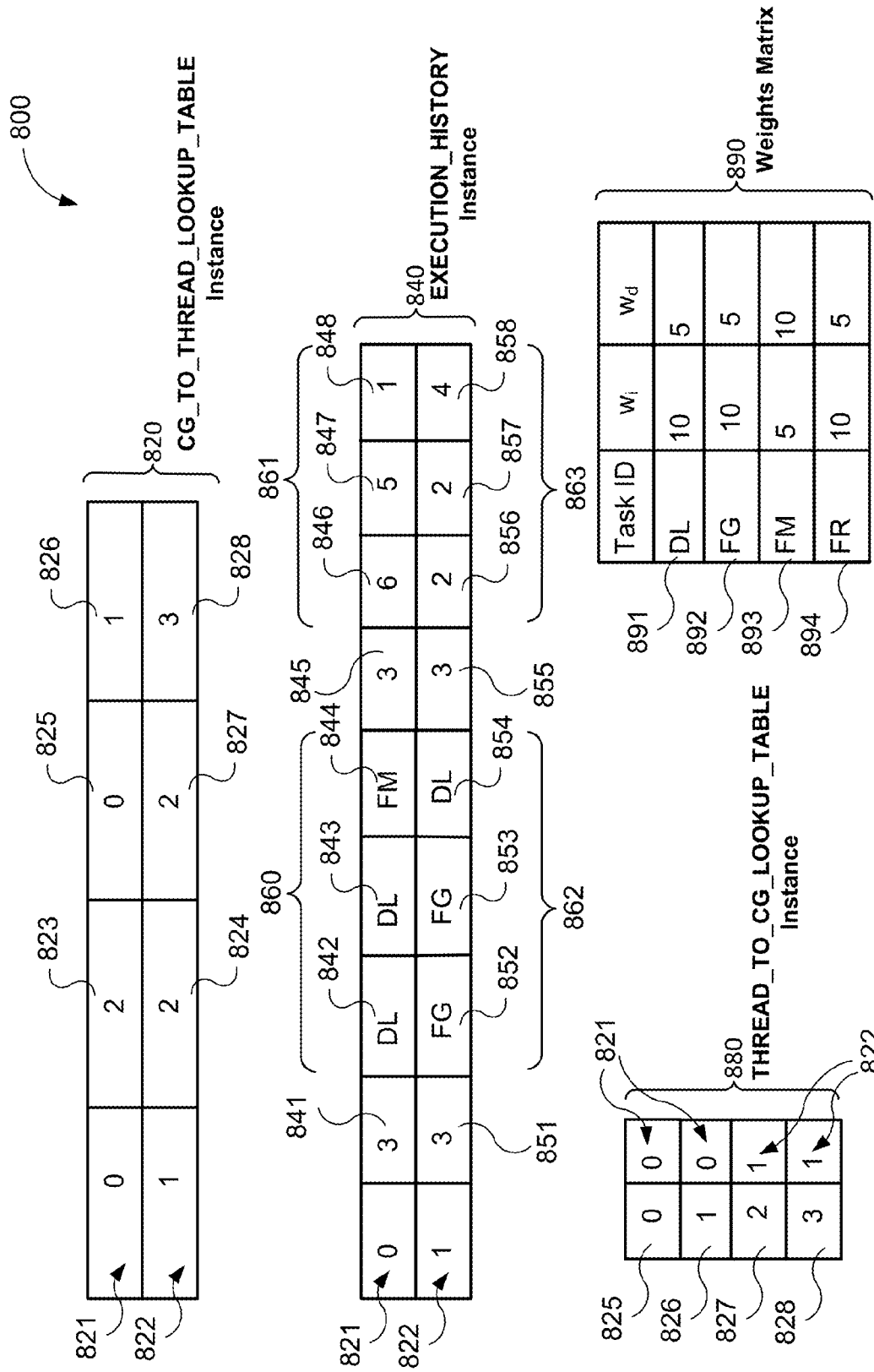
FIG. 8 illustrates the memory content of the EXECUTION_REGISTER 380 data structures (as per the memory layout in FIG. 4) at a given point in time of the execution of a multithreaded software program.

Three examples will now be described with reference to FIG. 8, representing structures akin to those of FIG. 4. A raster image processor (RIP) application program used in a printing system is used to describe the following examples. The RIP application program forms part of the controlling program 130. A RIP is typically required to convert the high-level description of a page from a print description language (PDL) to a raster representation. A high-level PDL description of a page contains graphic objects such as text, lines, fill regions, and image data, and the order in which those graphic objects are to be rendered to the raster representation. This order is commonly known in the art as z-order. A raster representation of the page is made up of colour pixel data. A printer engine will then typically print the raster representation of the page onto print media, such as paper. Before producing a raster representation, a RIP may produce an intermediate page representation of the page. An intermediate page representation of the page will typically be more compact than a raster representation, but can be quickly and easily converted to a raster representation.

Figure 11A:
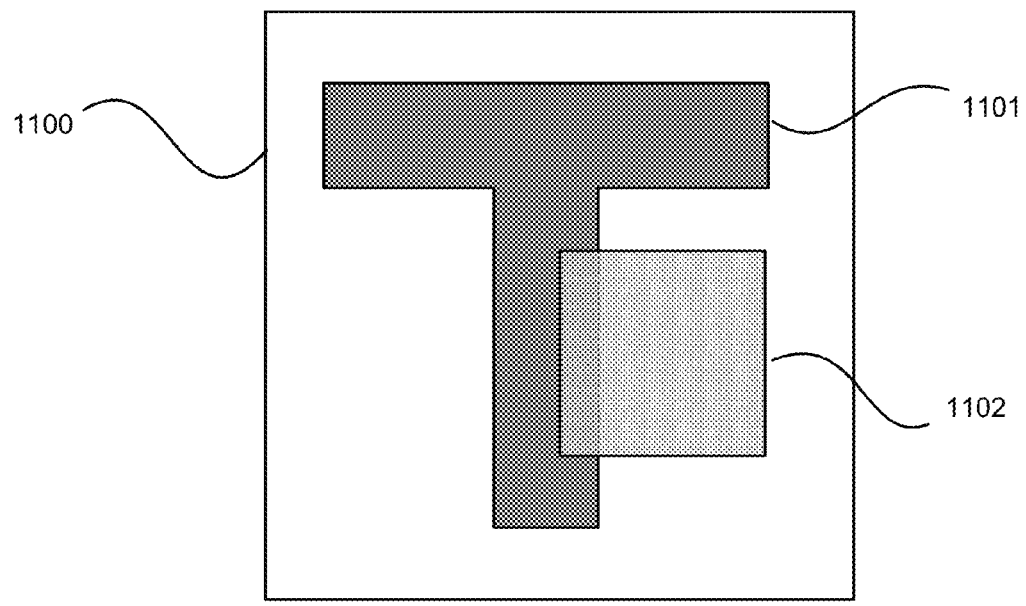
FIGS. 11A to 11D illustrate the formation of a fillmap representation as part of a printing process.

An example of an intermediate page representation, known as a "fillmap", will now be described with reference to FIGS. 11A to 11D. FIG. 11a shows a page representation 1100. The page 1100 has a white background and the page contains two graphic objects 1101 and 1102. The first graphic object 1101 is an opaque "T" shaped object with a grey flat fill. The second graphic object 1102 is a transparent square with a hatched fill. Examples of other fills are blends representing a linearly varying colour, bitmap images or tiled (i.e. repeated) images. The second graphic object 1102 partially overlaps the first graphic object 1101.

Figure 11B:
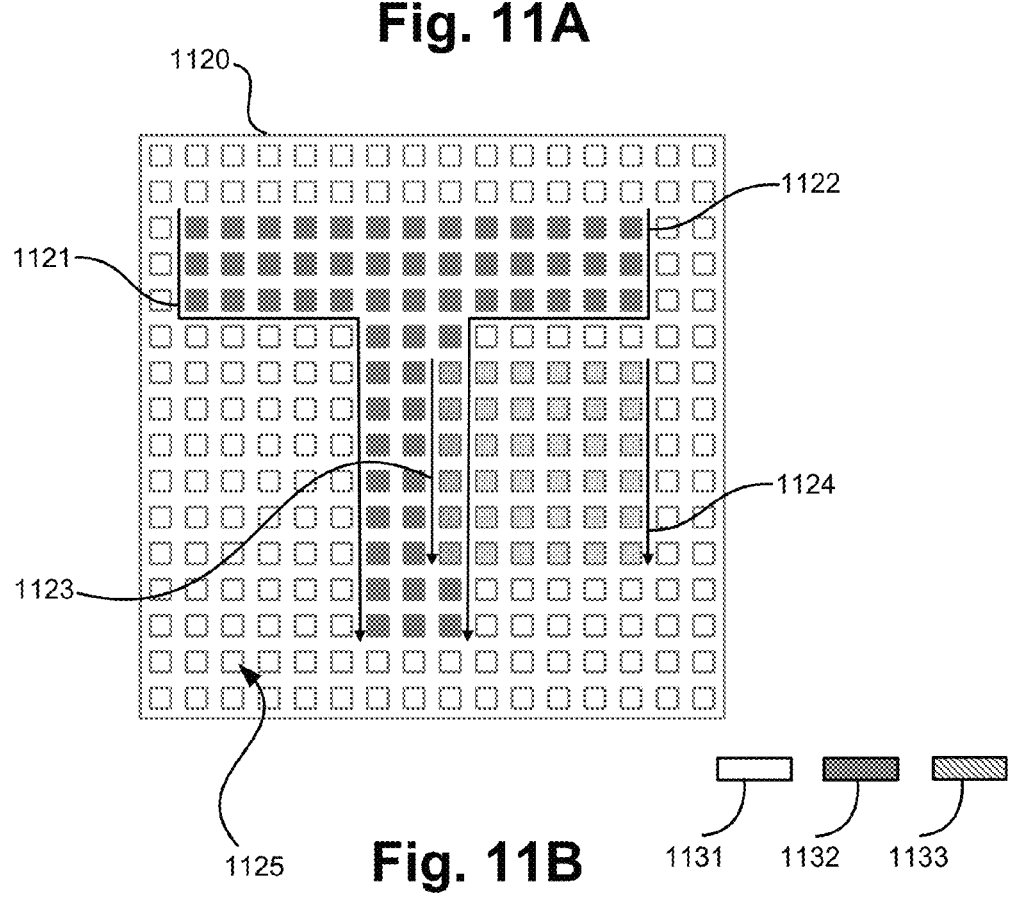

FIG. 11B shows the decomposition of the graphic objects 1102 and 1102 of the page 1100 into pixel-aligned graphic object edges, levels and fills according to a pixel grid 1120. A graphic object is decomposed into two or more pixel-aligned object edges, a single level, and one or more fills. Pixel-aligned graphic object edges define the activation or deactivation of a level during rasterization. Pixel-aligned graphic object edges therefore refer to the level of the object from which they are derived. The first graphic object 1101 is decomposed into two pixel-aligned graphic object edges 1121 and 1122, and a level 1132 that consists of a grey flat fill. Pixel-aligned graphic object edges 1121 and 1122 refer to the level 1132 of the first graphic object 1101. The second graphic object 1102 is decomposed into two pixel-aligned graphic object edges 1123 and 1124, and a level 1133 that consists of a transparent hatched fill. Pixel-aligned graphic object edges 1123 and 1124 refer to the level 1133 of the second graphic object 1102. The background 1125 has a level 1131 that consists of a white fill.

Figure 11C:
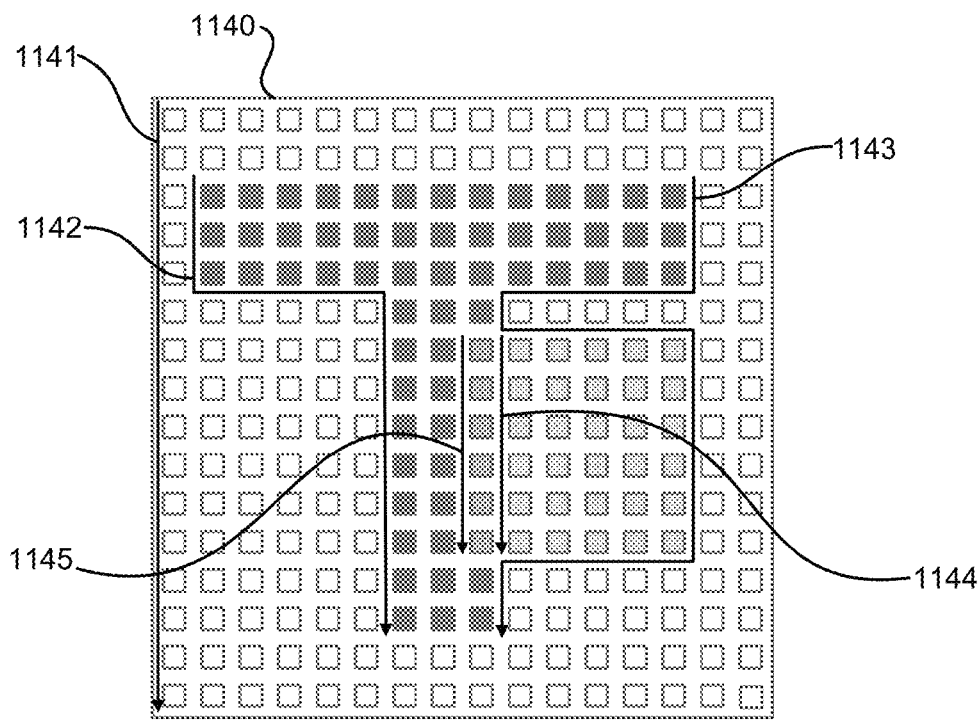

FIG. 11C shows a fillmap representation 1140 of the page 1100 represented in FIG. 11A. The fillmap representation 1140 is composed of five pixel-aligned fillmap edges. Each pixel-aligned fillmap edge references a fill sequence which will be used to determine the colour of each of the pixels activated by that pixel-aligned fillmap edge. On any given scan line on which a pixel-aligned fillmap edge is active, the pixel-aligned fillmap edge will activate those pixels which are immediately to the right of the pixel-aligned fillmap edge, until the next pixel-aligned fillmap edge or a page boundary is encountered. The first pixel-aligned fillmap edge 1141 traces the left hand boundary of the page, and references a fill sequence 1151 which contains a single opaque level which is to be filled using the background fill. The second pixel-aligned fillmap edge 1142 traces the left hand boundary of the first graphic object 1101, and references a fill sequence 1152 that contains a single level which is opaque and is to be filled using a grey flat fill. The third pixel-aligned fillmap edge 1143 references the same fill sequence 1151 as the first pixel-aligned fillmap edge 1141. The fourth pixel-aligned fillmap edge 1144 traces the left hand boundary of the region where the second object 1102 overlaps the white background. The fourth pixel-aligned fillmap edge 1144 references a fill sequence 1154 which contains two levels. The top most level is transparent and is to be filled using a hatched fill. The bottom most level is opaque and is to be filled using the background fill. The fifth pixel-aligned fillmap edge 1145 traces the left hand boundary of the region where the second graphic object 1102 overlaps the first graphic object 1101. The fifth pixel-aligned fillmap edge 1145 references a fill sequence 1153 which contains two levels. The top most level is transparent and is to be filled using a hatched fill. The bottom most level is opaque and is to be filled using a grey flat fill.

Accompanying the fillmap representation 1140 of the page is a table of fill sequences which contains the fill sequences 1151, 1152, 1153 and 1154 referenced by the pixel-aligned fillmap edges contained in the fillmap representation 1140 of the page.

Figure 11D:
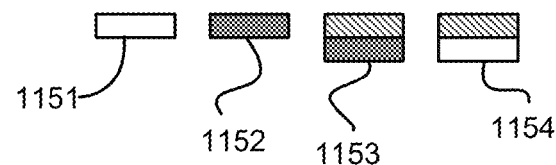
Figure 11D:
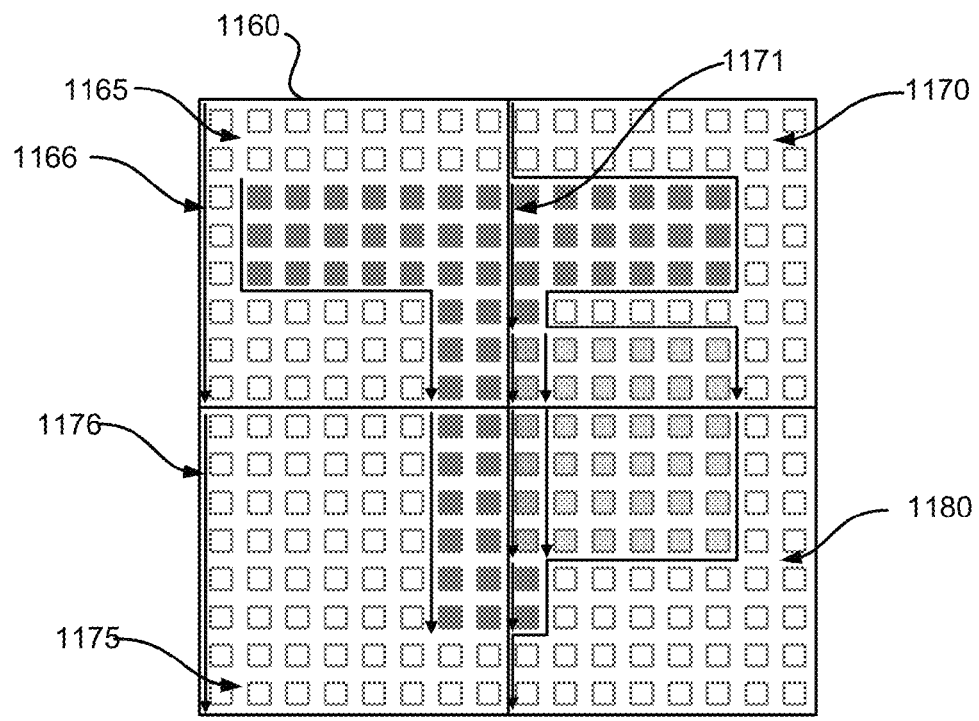

FIG. 11D shows a tiled fillmap representation 1160 of the page represented in FIG. 11A. The tiled fillmap contains four tiles 1165, 1170, 1175 and 1180. Each tile has a height and width of eight pixels. In order to generate the tiled fillmap representation 1160 of the page, the pixel-aligned fillmap edges of the original fillmap representation 1140 have been split across fillmap tile boundaries. For example, the pixel-aligned fillmap edge 1141 which traces the left hand boundary of the page in the untiled fillmap representation 1140 shown in FIG. 11C has been divided into two pixel-aligned fillmap edges 1166 and 1176. The first pixel-aligned fillmap edge 1166 activates pixels in the top-left hand tile 1165, while the second pixel-aligned fillmap edge 1176 activates pixels in the bottom-left hand tile 1175. Also, new pixel-aligned fillmap edges have been inserted on the tile boundaries to activate the left most pixels of each tile which were previously activated by a pixel-aligned fillmap edge in a tile to the left of the tile in which the pixels reside. For example, in the top-right tile 1170 a new pixel-aligned fillmap edge 1171 has been inserted to activate pixels which were activated by the pixel-aligned fillmap edge 1142 which traces the left hand boundary of the first graphic object 1101 in the original fillmap representation 1140 shown in FIG. 11c.

The RIP application used to describe the following examples consists of four types of tasks: display list generation (DL), fillmap generation (FG), fillmap merging (FM) and fillmap rendering (FR). A DL task reads a sequence of z-ordered graphic objects from a PDL document and creates a display list. A display list typically consists of a y-sorted list of graphic objects, and is commonly known in the art. For a given page to be printed, several DL tasks may be required to process different sequences of z-ordered graphic objects. Each sequence is known as a z-band, and the display list produced by a DL task for such a sequence is known as a z-band display list. For each z-band display list, an FG task produces a fillmap representation, known as a z-band fillmap. The fillmap representation was described previously with reference to FIGS. 11A to 11D. An FM task receives two or more z-band fillmaps and merges them into a single fillmap. If there are more z-band fillmaps remaining for the page, additional FM tasks are required to merge the z-band fillmaps. If there are no more z-band fillmaps left to merge, the fillmap produced by the FM task represents all graphic objects on the page. An FR task is then used to convert the fillmap to a raster representation ready for printing.

FIG. 8 shows a state 800 of the EXECUTION_REGISTER 380 at a given time during the execution of Controlling Program 130. In the examples depicted in FIG. 8, there are two CGs: CG0 (821) and CG1 (822), as shown in the first structure 820, representing an instance of a CG_TO_THREAD_LOOKUP_TABLE of the EXECUTION_REGISTER 380. CG0 821 contains two threads (as indicated in field 823) and CG1 also contains two threads (as indicated in field 824). CG0 contains thread "0" and thread "1", as indicated in fields 825 and 826 respectively. CG1 contains thread "2" and thread "3", as indicated in fields 827 and 828 respectively.

A second structure 840 of the EXECUTION_REGISTER 380 contains an instance of an EXECUTION_HISTORY table of CG 0 and CG 1. The TASK_HISTORY_QUEUE 860 for CG 0 (821) has three entries (as specified in field 841), shown in fields 842-844. The DATA_HISTORY_QUEUE 861 of CG0 (821) has three entries (as specified in field 845), shown in fields 846-848. The TASK_HISTORY_QUEUE 862 for CG1 (822) has three entries (as specified in field 851) shown in fields 852-854. The DATA_HISTORY_QUEUE 863 for CG1 (822) has three entries (as specified in field 855) shown in fields 856-858.

As described earlier with reference to FIG. 4, the TASK_HISTORY_QUEUE contains a history of the types of tasks executed on each computational group. Therefore, TASK_HISTORY_QUEUEs 860 and 862 contain values that are either DL, FG, FM or FR (FR is not shown in this example), corresponding to the four task types in the example RIP application. These values are indicative of the cached instructions that can potentially be reused by future tasks. Similarly, the DATA_HISTORY_QUEUE contains a history of the data used by tasks executed on each computational group. In the example RIP application, the number of the page being processed for a given task is indicative of the data being processed. Therefore, DATA_HISTORY_QUEUEs 861 and 863 contain page numbers. The numbers of the page are indicative of the cached data that can potentially be reused by future tasks.

In the following examples, a weights matrix 890, which forms part of the EXECUTION_REGISTER 380, is used to determine the relative importance of instructions and data when processing a given task. The relative importance of instructions and data are used to either select a suitable thread to execute a given task, or a suitable task to be executed on a given thread. The weights used in the following examples are shown in the Weights Matrix 890 in FIG. 8. There are four types of tasks that can be executed: DL (891), FG (892), FM (893) and FR (894) and the values of $w_i$ and $w_d$ are preferably dependent upon those given for each task type in the Weights Matrix 890. The weights in the Weights Matrix 890 may be determined in various ways such as analysing historical data obtained in previous executions of Controlling Program 130, complexity analysis of the program code and other. In other words, the weightings are determined based on the execution history of the subset of threads. In another implementation, the weightings are pre-determined based on knowledge of the tasks and stored in a lookup table in memory 120.

In the example RIP application, DL (Display List generation) tasks execute a well-defined sequence of instructions, and each DL task processes a separate sequence of graphic objects. Therefore, for DL tasks, $w_i$ is given a higher value than $w_d$. The same reasoning is applicable to FG (Fillmap Generation) tasks, which also process separate z-bands of data. Furthermore, in the example RIP application, FG tasks are usually executed on separate threads to DL tasks, and can therefore not often make use of display list data produced by DL tasks. Therefore, for FG tasks, $w_i$ is also given a higher value than $w_d$. FM (Fillmap Merging) tasks receive fillmap data produced by multiple FG tasks. This fillmap data can consume a large amount of memory, so it is beneficial to reuse fillmap data stored in cache whenever possible. Therefore, for FM tasks, $w_d$ is given a higher value than $w_i$. Each FR (Fillmap Rendering) task processes a fillmap from a separate page being printed. Therefore, there is little opportunity for data reuse between FR tasks. Therefore, for FR tasks, $w_i$ is given a higher value than $w_d$. Having this knowledge of tasks and their behaviour with respect to instruction and data usage means that the weightings can be based on task types.

Example 1

An example of selecting a task for a given thread will now be described. Assume that thread "0" has become available after processing the task [DL,6]. Task [FM,2] is at the head of the READY_TASK_QUEUE 355 followed by other tasks ready to be executed placed in descending priority order. The state of the READY_TASK_QUEUE 355 is as follows:

[FM,2] [DL,7] [DL,8] [FG,3] [FG,4] [FG,5].

As described previously with reference to FIG. 3, a MESSAGE 315 is sent to the Task-Thread Selector 340. In Example 1, the MESSAGE 315 is of type MATCH_THREAD and contains thread ID "0" (825). The process 535 described previously with reference to FIG. 6 will therefore be executed, thereby selecting a suitable task from the READY_TASK_QUEUE 355 to execute on thread "0". The CG of thread "0" is CG 0 (821) and, therefore the execution history of CG 0 will be used in determining which task to run on thread "0".

The scheduler 345, in process 535, selects the first task from the READY_TASK_QUEUE 355 which, in this example, is task [FM,2]. Being an FM type of task, according to the Weights Matrix 890, the task [FM,2] has an $w_i=5$ and $w_d=10$, which means that data reuse is more important than instruction reuse for the task [FM,2].

Process 535 therefore determines if the DATASET_ID=2 is in the DATA_HISTORY_QUEUE 861 in step 630. The DATA_HISTORY_QUEUE 861 does not contain DATASET_ID=2. Therefore, process 535 proceeds to the next task in the READY_TASK_QUEUE 355 which, in Example 1, is the task [DL,7].

The task [DL,7] is of type DL and, according to the Weights Matrix 890, has $w_i=10$ and $w_d=5$, which means that for the DL task type, instruction reuse is more important. Process 535 therefore determines if the TASK_ID=DL is in the TASK_HISTORY_QUEUE 860 of CG 0 of thread "0" in step 625. The TASK_HISTORY_QUEUE 860 of CG 0 of thread "0" does contain a TASK_ID=DL. Therefore, process 535 determines that task [DL,7] is suitable to be executed by thread "0". Process 535 ends and steps 545, 550 and 555 are executed in which the Boolean parameter MATCHED is set to True, the execution history of CG 0 in the EXECUTION_REGISTER 380 is updated and MATCHED_MESSAGE is created in step 555 with the value of MATCHED and the thread-task pair ("0", [DL,7]).

Example 2

An example of selecting a thread for a given task will now be described. Assume that a request is made for task [FM,2] to be executed. The state of the AVAILABLE_THREADS_LIST 360 is as follows:

{"0", "3"}.

As described previously with reference to FIG. 3, MESSAGE 315 is sent to the Task-Thread Selector 340. In Example 2, the MESSAGE 315 is of type MATCH_TASK for task [FM,2]. The process 540 described previously with reference to FIG. 7A will therefore be executed, thereby selecting a suitable thread from the AVAILABLE_THREADS_LIST 360 to execute the task [FM,2]. The CG_LIST created in step 705 is: {CG 0, CG 1} as both CGs have at least one idle thread.

Task [FM,2] is of type FM and, according to the Weights Matrix 890, this task has an $w_i=5$ and $w_d=10$, which means that data reuse is more important for the task [FM,2]. Process 540 therefore selects a thread for data reuse. Process 725, described previously with reference to FIG. 7B, is therefore executed.

Process 725 selects the first CG from the list of CGs with available threads, CG_LIST, which, in this example, is CG0. As data reuse is the goal of process 725, process 725 determines if the DATASET_ID=2 associated with task [FM,2] is in the DATA_HISTORY_QUEUE 861 of CG0. The DATA_HISTORY_QUEUE 861 does not contain DATASET_ID=2 although TASK_HISTORY_QUEUE 860 contains 'FM'. Therefore, process 725 proceeds to the next CG with available threads in CG_LIST which, in Example 2, is CG1.

The DATA_HISTORY_QUEUE 863 does contain DATASET_ID=2. Therefore, the scheduler 345, in process 725, determines that an available thread from CG1 is suitable for executing the task [FM,2]. Process 725 selects the available thread "3" from CG1. Next, steps 545, 550 and 555 are executed in which the Boolean parameter MATCHED is set to True, the execution history of CG 1 in the EXECUTION_REGISTER 380 is updated and MATCHED_MESSAGE is created in step 555 with the value of MATCHED and the thread-task pair ("3", [FM,2]).

Example 3

Another example of selecting a thread for a given task will now be described. Example 3 illustrates the case when instruction reuse is important for the given task, but it cannot be satisfied by any of the available threads. Assume that the task [FR,1] is waiting to be executed. The state of the AVAILABLE_THREADS_LIST 360 is as follows:

{"0", "3"}.

As described previously with reference to FIG. 3, MESSAGE 315 is sent to the Task-Thread Selector 340. In this example, the MESSAGE 315 is of type MATCH_TASK for task [FR,1]. The process 540 described previously with reference to FIG. 7A will therefore be executed, thereby selecting a suitable thread from the AVAILABLE_THREADS_LIST 360 to execute the task [FR,1]. The CG_LIST created in step 705 is: {CG 0, CG 1} as both CGs have at least one idle and, therefore, available thread.

Task [FR,1] is of type FR and, according to the Weights Matrix 890, has an instruction $w_i=10$ and $w_d=5$, which means that instruction reuse is more important for [FR,1]. Process 540 therefore decides to select a thread for instruction reuse. Process 730, described previously with reference to FIG. 7C, is therefore executed.

The scheduler 345, in process 730, selects the first CG from the list of CGs with available threads, CG_LIST, which, in this example, is CG 0. As instruction reuse is the goal of process 730, process 730 determines if the TASK_ID=FR associated with task [FR,1] is found in TASK_HISTORY_QUEUE 860 of CG0. The TASK_HISTORY_QUEUE 860 does not contain TASK_ID=FR.

Therefore, process 730 proceeds to the next CG with available threads in CG_LIST which, in the present example, is CG1. Process 730 also determines that the TASK_HISTORY_QUEUE 860 associated with CG 1 does not contain TASK_ID=FR. Therefore, process 730 proceeds to find a suitable thread for data reuse.

Process 730 determines if the DATASET_ID=1 associated with task [FR,1] is in the DATA_HISTORY_QUEUE 861 of CG 0. The DATA_HISTORY_QUEUE 861 does contain DATASET_ID=1. Therefore, process 730 determines that an available thread from CG 0 is suitable for executing task [FR,1]. Process 730 selects thread "0" from CG0. Thread "0" will subsequently proceed to execute task [FR,1].

Next, steps 545, 550 and 555 are executed in which the Boolean parameter MATCHED is set to True, the execution history of CG 0 in the EXECUTION_REGISTER 380 is updated and MATCHED_MESSAGE is created in step 555 with the value of MATCHED and the thread-task pair ("0", [FR,1]).

Figure 9:
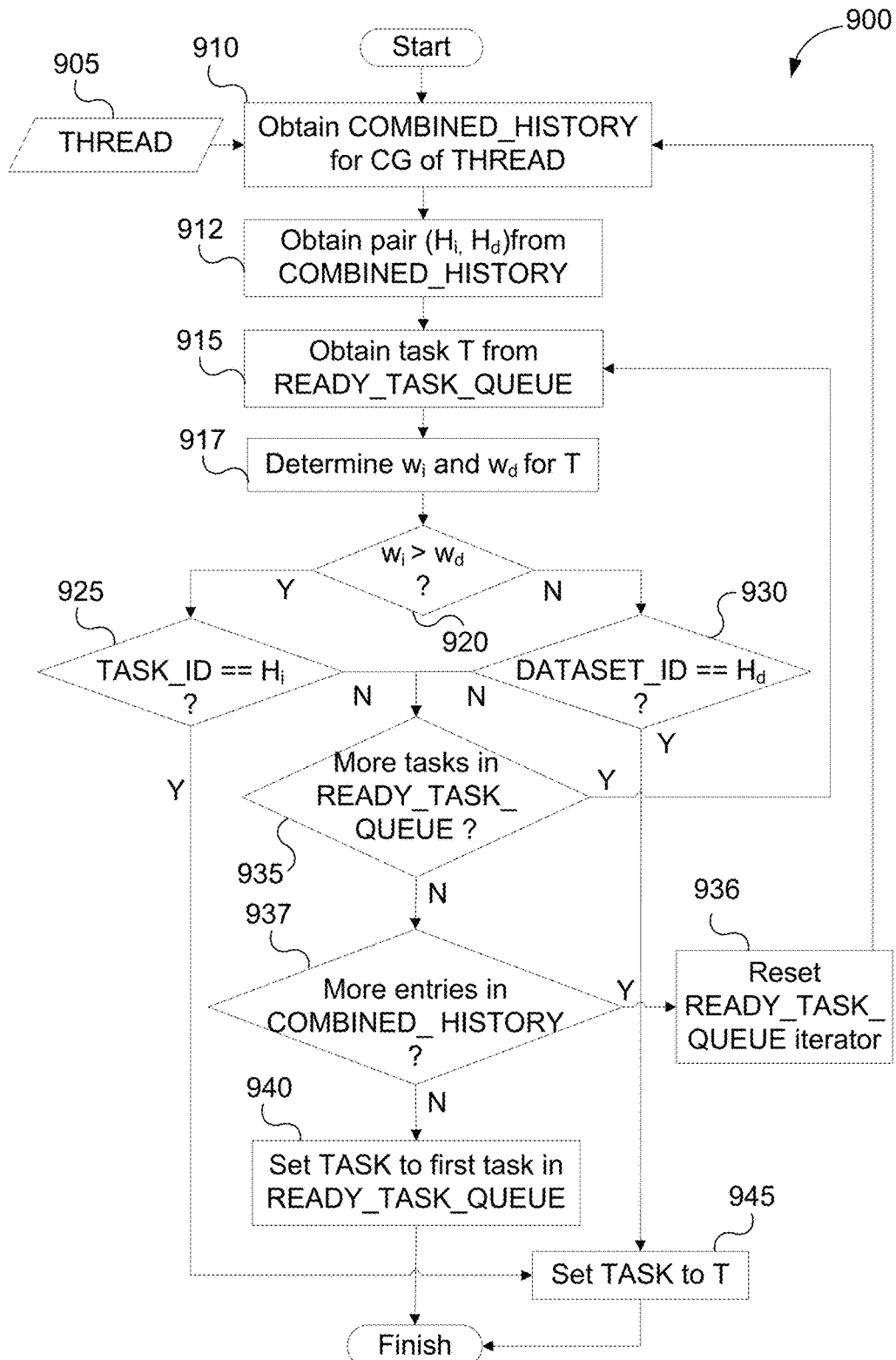
FIG. 9 is a data flow diagram of an alternative approach to that shown in FIG. 6 for selecting a task to run on a given thread.

An alternate implementation will now be described with reference to a process 900 of selecting a suitable task to run on a given THREAD as illustrated in FIG. 9. The process 900 may be used instead of the process 535 as depicted in FIG. 6. In this implementation, the instruction and data history kept in the EXECUTION_HISTORY 440 structure are combined with the more recent items in both the TASK_HISTORY_QUEUE 490 and the DATA_HISTORY QUEUE 495 for the CG of THREAD 905 checked before the less recent items in these two queues.

The process 900 uses a list structure COMBINED_HISTORY created from the TASK_HISTORY_QUEUE 490 and the DATA_HISTORY QUEUE 495 for the CG of THREAD 905. The list structure is formed in a process known in the art as convolution (or zip) which, in general, maps a tuple of sequences into a sequence of tuples. In this case, respective items $H_i$ and $H_d$ of the TASK_HISTORY_QUEUE 490 and the DATA_HISTORY QUEUE 495 form a sequence of pairs kept in the COMBINED_HISTORY list. If either history queue is shorter than the other, the entries that do not have a counterpart from the other queue, and are paired with the value Null. For example, the COMBINED_HISTORY list for a given CG might look as follows:

{(DL,6), (DL,5), (DL,4), (Null,3), (Null,2)} for the case where the TASK_HISTORY_QUEUE 490 has three entries and the DATA_HISTORY QUEUE 495 has five entries for that CG.

Process 900 will now be described. The process 900 starts with step 910, where the scheduler 345 obtains the history of the CG of THREAD 905 and created a COMBINED_HISTORY list for that CG. This is achieved by accessing the record for THREAD 905 from the THREAD_TO_CG_LOOKUP_TABLE 480 and obtaining field 484 where the CG ID to which THREAD 905 belongs, which is then stored. Next, in the EXECUTION_HISTORY 440 structure, the execution history comprising the TASK_HISTORY_QUEUE 490 and the DATA_HISTORY_QUEUE 495 for that CG is accessed and the COMBINED_HISTORY list of pairs is created as described above. Step 912 starts a process of iterating through the entries of the COMBINED_HISTORY list by obtaining the first pair of history entries ($H_i$,$H_d$).

In step 915, the scheduler 345 starts a process of iterating through the entries in the READY_TASK_QUEUE 355 until a task suitable to run on THREAD 605 is found. In step 915, starting from the head of the READY_TASK_QUEUE 355, a task T is obtained. In step 917, the scheduler 345 determines the weights $w_i$ and $w_d$ for the task T. This weight determination can be achieved in various ways, one being, but not limited to, using a lookup table of pre-determined values for $w_i$ and $w_d$ for all task types in the Controlling Program 130. In decision step 920, the scheduler 345 checks if $w_i$ is greater than $w_d$. If that is the case, then instruction reuse is more important than data reuse for the task T, and processing continues with the scheduler 345 checking, in decision step 925, if TASK_ID of TASK is the same as the task type $H_i$ from the pair of history entries ($H_i,H_d$) obtained in step 912. If that is the case, the task T is suitable, therefore step 945 sets TASK to T, with which process 900 ends.

If in step 920, the scheduler 345 determines that $w_i$ is not greater than $w_d$, then instruction reuse is no more important than data reuse for task T, and step 930 checks if the DATASET_ID associated with the task T is the same as the DATASET_ID=$H_d$ from the pair of history entries ($H_i,H_d$) obtained in step 912. If that is the case, task T is a suitable task, therefore, step 945 sets TASK to the task T, with which process 900 ends.

The process of obtaining a task T from the READY_TASK_QUEUE 355 and checking if either its TASK_ID or DATASET_ID are in the COMBINED_HISTORY list is repeated for each task in the READY_TASK_QUEUE 355 until a task with either matching $H_i$ or $H_d$ is found, or until the end of the queue is reached, as tested in step 935.

When there are no more tasks in the READY_TASK_QUEUE 355 to be checked, determined at decision step 935, processing proceeds to step 937, wherein the scheduler 345 checks if there are more entries in the COMBINED_HISTORY list that have not been checked. If that is the case, step 936 resets the READY_TASK_QUEUE 355 iterator in order to start checking the tasks in the READ_TASK_QUEUE 355 from the beginning for suitability against the next entry in the COMBINED_HISTORY list. Processing then returns to step 912 in which the next pair of history entries is obtained from the COMBINED_HISTORY list.

If in decision step 937, the scheduler 345 determines that there are no more entries in the COMBINED_HISTORY list to check, the process 900 proceeds to step 940 which sets TASK to the first task in the READY_TASK_QUEUE 355. The task at the head of the queue is the highest priority task and when cache content reuse cannot be achieved, the first task in the READY_TASK_QUEUE 355 is the task dispatched for execution. Process 900 ends with step 940.

Process 900 may be used instead of process 535 in FIG. 5 to improve the cache content reuse opportunities with some extra overhead due to the increased complexity of iterating through both the entries in the execution history queues TASK_HISTORY_QUEUE 490 and the DATA_HISTORY QUEUE 495, and the READY_TASK_QUEUE 355.

INDUSTRIAL APPLICABILITY

The arrangements described are applicable to the computer and data processing industries and particularly for cache memory to improve cache re-use.

Figure 10B:
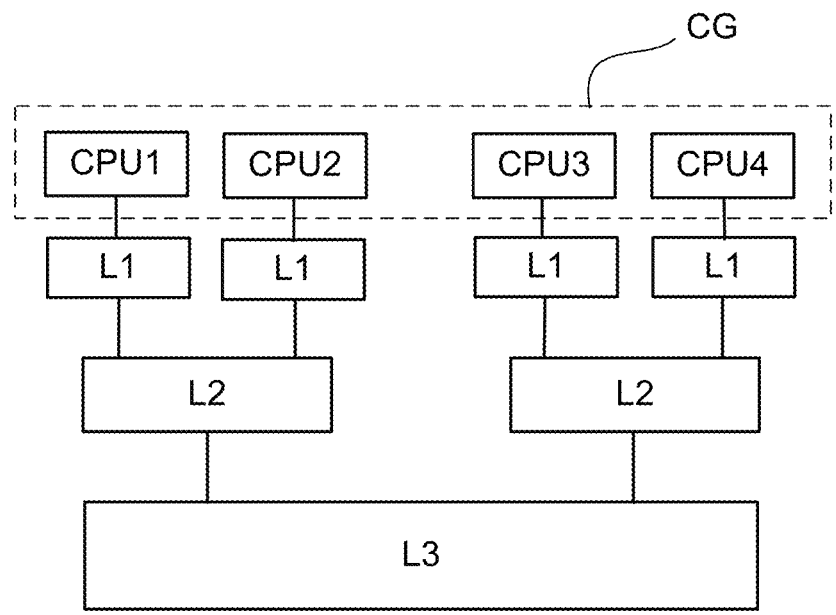

The foregoing describes only some embodiments of the present invention, and modifications and/or changes can be made thereto without departing from the scope and spirit of the invention, the embodiments being illustrative and not restrictive. For example, whilst the preferred arrangements described are focussed on dynamic configuration of the computational groups for optimising the L2 cache, by associating each computational group with a corresponding L2 cache, the same principles may be applied to optimise other cache levels, such as the L3 cache, as depicted in FIG. 10B. In FIG. 10B, a computational group CG is formed that corresponds to the L3 cache for L3 optimisation.

The invention claimed is:

1. A method of determining a thread from a plurality of threads to execute a task in a multi-processor computer system, said plurality of threads being grouped into at least one subset associated with a cache memory of the computer system, said task having an associated set of data and a type determined by a set of instructions, said method comprising the steps of:
    obtaining an execution history of the subset of the plurality of threads;
    determining a weighting for each of the set of instructions and the set of data, said weightings depending on the type of the task;
    determining a suitability of the subset of the threads to execute the task based on the execution history and the determined weightings; and
    subject to the determined suitability of the subset of the threads, determining a thread from the subset of the threads to execute the task using content of the cache memory associated with the subset of the threads.

2. The method according to claim 1, wherein said weightings determine one of a task history and a data history to be used to determine the suitability of the subset of the threads to be used.

3. The method according to claim 2, wherein said determining the suitability of the subset of the threads comprises the sub-steps of:
    checking the task history to determine the suitability of the subset of the threads to execute the task before the data history in an event that the weighting for the instruction is larger than the weighting for the data; and
    checking the data history to determine the suitability of the subset of the threads to execute the task before the task history in an event that the weighting for the data is larger than the weighting for the instruction.

4. The method according to claim 1, wherein the weightings are determined based on the execution history of the subset of the plurality of threads.

5. The method according to claim 1, wherein the weightings are determined using a lookup table.

6. The method according to claim 1, wherein the execution history has a size dependent on a size of the cache memory.

7. The method according to claim 1, wherein the execution history has a size dependent on a size of most commonly executed instructions associated with a set of tasks executed by the threads.

8. The method according to claim 1, wherein the execution history has a size dependent on data used by a set of tasks executed by the threads.

9. A non-transitory computer readable storage medium having a program recorded thereon, the program being executable in a computer system to perform the method of claim 1.

10. A method of managing cache reuse of a cache memory to process a print task in a multi-processor computer system, said cache memory being associated with a subset of a plurality of threads, said task having an associated set of data and a type determined by a set of instructions for the print task, said method comprising the steps of:
    obtaining an execution history of the subset of the plurality of threads;
    determining a weighting for each of the set of instructions and the set of data, said weightings depending on the type of the task;

determining a suitability of the subset of the threads to execute the print task based on the execution history and the determined weightings; and reusing the cache memory in an event that the subset of the threads is determined to be suitable by determining a thread from the subset of the threads to process the print task.

11. A non-transitory computer readable storage medium having a program recorded thereon, the program being executable in a computer system to perform the method of claim 10.

12. A method of determining a task from a plurality of tasks for execution by a thread in a multi-processor computer system, said thread being one of a plurality of threads grouped into at least one subset associated with a cache memory of the computer system, said task having an associated set of data and a type determined by a set of instructions, said method comprising the steps of:

obtaining an execution history of the thread and an identity of a corresponding cache memory;

identifying an available task for execution and determining a weighting for each of the set of instructions and the set of data, said weightings depending on the type of the identified task;

determining a suitability of the identified task to execute upon the thread based on the execution history and the determined weightings; and subject to the determined suitability of the subset of the threads, determining the identified task from the plurality of tasks to be executed upon the thread based on content of the corresponding cache memory.

13. The method according to claim 12, wherein said weightings determine one of a task history and a data history to be used to determine a task to be used.

14. The method according to claim 12, wherein said determining the suitability of a task from a plurality of tasks for execution by a thread comprises the sub-steps of:

checking the task history to determine the suitability of said task to be executed by said thread in an event that the weighting for the instruction is larger than the weighting for the data for said task; and checking the data history to determine the suitability of said task to be executed by said thread in an event that the weighting for the data is larger than the weighting for the instruction for said task.

15. A non-transitory computer readable storage medium having a program recorded thereon, the program being executable in a computer system to perform the method of claim 12.

16. A computer system comprising multiple processors and cache memory, and a program stored in a memory of the computer system and executable by at least one of the processors for determining a thread from a plurality of threads to execute a task in the computer system, said plurality of threads being grouped into at least one subset associated with a cache memory of the computer system, said task having an associated set of data and a type determined by a set of instructions, said program comprising code executable for:

obtaining an execution history of the subset of the plurality of threads;

determining a weighting for each of the set of instructions and the set of data, said weightings depending on the type of the task;

determining a suitability of the subset of the threads to execute the task based on the execution history and the determined weightings; and subject to the determined suitability of the subset of the threads, determining a thread from the subset of the threads to execute the task using content of the cache memory associated with the subset of the threads.

17. A computer system comprising multiple processors and cache memory, and a program stored in a memory of the computer system and executable by at least one of the processors to manage cache reuse of the cache memory to process a print task in the computer system, said cache memory being associated with a subset of a plurality of threads, said task having an associated set of data and a type determined by a set of instructions for the print task, said program comprising code executable for:

obtaining an execution history of the subset of the plurality of threads;

determining a weighting for each of the set of instructions and the set of data, said weightings depending on the type of the task;

determining a suitability of the subset of the threads to execute the print task based on the execution history and the determined weightings; and reusing the cache memory in an event that the subset of the threads is determined to be suitable by determining a thread from the subset of the threads to process the print task.

18. A computer system comprising multiple processors and cache memory, and a program stored in a memory of the computer system and executable by at least one of the processors to determine a task from a plurality of tasks for execution by a thread in the computer system, said thread being one of a plurality of threads grouped into at least one subset associated with a cache memory of the computer system, said task having an associated set of data and a type determined by a set of instructions, said program comprising code executable for:

obtaining an execution history of the thread and an identity of a corresponding cache memory;

identifying an available task for execution and determining a weighting for each of the set of instructions and the set of data, said weightings depending on the type of the identified task;

determining a suitability of the identified task to execute upon the thread based on the execution history and the determined weightings; and subject to the determined suitability of the subset of the threads, determining the identified task from the plurality of tasks to be executed upon the thread based on content of the corresponding cache memory.

19. A computer system having a plurality of processors, a cache memory associated with the processors, and configured to execute an application program using interactions between at least the processors and the cache memory, said computer system comprising a scheduler configured for determining a thread from a plurality of threads to execute a task of the application program in the computer system, said plurality of threads being grouped into at least one subset associated with the cache memory, said task having an associated set of data and a type determined by a set of instructions, said scheduler operating to:

obtaining an execution history of the subset of the plurality of threads;

determining a weighting for each of the set of instructions and the set of data, said weightings depending on the type of the task;

determining a suitability of the subset of the threads to execute the task based on the execution history and the determined weightings; and subject to the determined suitability of the subset of the threads, determining a thread from the subset of the threads to execute the task using content of the cache memory associated with the subset of the threads.

20. A method of determining a suitable thread-task association for at least one task to be executed by at least one thread of a plurality of threads in a multi-processor computer system, said method comprising:
- obtaining an execution history of at least one thread and identifying a corresponding cache memory;
- receiving at least one task associated with a set of instructions and a set of data, wherein the type of the task is determined by the set of instructions;
- determining, depending on the type of the task, a weighting for each of the set of instructions and the set of data; and
- determining, based to the execution history and the determined weightings, a suitable thread-task association using content of the corresponding cache memory.

* * * * *